US012735607B2

(12) United States Patent
Tao et al.

(10) Patent No.: US 12,735,607 B2
(45) Date of Patent: Sep. 15, 2026

(54) METHOD TO IMPROVE TOUGHNESS OF ADHESIVELY BONDED COMPOSITE JOINTS

(71) Applicant: KING ABDULLAH UNIVERSITY OF SCIENCE AND TECHNOLOGY, Thuwal (SA)

(72) Inventors: Ran Tao, Thuwal (SA); Ahmed Wagih, Thuwal (SA); Arief Yudhanto, Thuwal (SA); Gilles Lubineau, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 941 days.

(21) Appl. No.: 17/788,910

(22) PCT Filed: Dec. 17, 2020

(86) PCT No.: PCT/IB2020/062128
§ 371 (c)(1),
(2) Date: Jun. 24, 2022

(87) PCT Pub. No.: WO2021/140391
PCT Pub. Date: Jul. 15, 2021

(65) Prior Publication Data

US 2023/0028728 A1 Jan. 26, 2023

Related U.S. Application Data

(60) Provisional application No. 62/957,905, filed on Jan. 7, 2020.

(51) Int. Cl.
*C09J 7/10* (2018.01)

(52) U.S. Cl.
CPC ............ *C09J 7/10* (2018.01); *C09J 2301/21* (2020.08)

(58) Field of Classification Search
CPC ............................... C09J 7/10; C09J 2301/21
See application file for complete search history.

(56) References Cited

FOREIGN PATENT DOCUMENTS

| | | | |
|---|---|---|---|
| WO | 2009089137 | A2 | 7/2009 |
| WO | 2013062996 | A1 | 5/2013 |

OTHER PUBLICATIONS

Boerio, F., et al., "Effect of Grit-Blasting on the Surface Energy of Graphite/Epoxy Composites," The Journal of Adhesion, Aug. 15, 2006, vol. 82, No. 1, pp. 19-37, Taylor & Francis.

Fischer, F., et al., "Laser Surface Pre-Treatment of CFRP for Adhesive Bonding in Consideration of the Absorption Behaviour," The Journal of Adhesion, Apr. 25, 2012; vol. 88, Issues 4-6, pp. 350-363, Taylor & Francis.

Holtmannspotter, J., et al., "The Use of Peel Ply as a Method to Create Reproduceable But Contaminated Surfaces for Structural Adhesive Bonding of Carbon Fiber Reinforced Plastics," The Journal of Adhesion, Nov. 26, 2012, vol. 89, No. 2, pp. 96-110, Taylor & Francis Group, LLC.

International Search Report in corresponding/related International Application No. PCT/IB2020/062128, date of mailing Apr. 30, 2021.

Li, X., et al., "How the Spatial Correlation in Adhesion Properties Influences the Performance of Secondary Bonding of Laminated Composites," International Journal of Solids and Structures, Apr. 22, 2020, vols. 196-197, pp. 41-52, Elsevier Ltd.

Moreira, R.D.F., et al., "Mode II Fracture Toughness of Carbon-Epoxy Bonded Joints with Femtosecond Laser Treated Surfaces," International Journal of Mechanical Sciences, Sep. 19, 2018, vol. 148, pp. 707-713, Elsevier Ltd.

Pascuzzo, A., et al., "On the Effect of Interfacial Patterns on Energy Dissipation in Plastically Deforming Adhesive Bonded Ductile Sheets," International Journal of Solids and Structures, Apr. 18, 2020, vol. 198, pp. 31-40, Elsevier Ltd.

Prolongo, S.G., et al., "Surface Pretreatments for Composite Joints: Study of Surface Profile by SEM Image Analysis," Journal of Adhesion Science and Technology, Aug. 2010; vol. 24, Issue 11-12, pp. 1855-1867.

Tao, R., et al., "In situ Analysis of Interfacial Damage in Adhesively Bonded Composite Joints Subjected to Various Surface Pretreatments," Composites Part A, Applied Science and Manufacturing, Oct. 25, 2018, vol. 116, pp. 216-223, Elsevier Ltd.

Tao, R., et al., "Laser-Based Interfacial Patterning Enables Toughening of CFRP/Epoxy Joints Through Bridging of Adhesive Ligaments," Composites Part A, 2020, vol. 139, 106094, pp. 1-9, Elsevier Ltd.

Tao, R., et al., "Laser-Based Surface Patterning of Composite Plates for Improved Secondary Adhesive Bonding," Composites Part A, Applied Science and Manufacturing, Mar. 1, 2018, vol. 109, pp. 84-94, Elsevier Ltd.

Tao, R., et al., "On Controlling Interfacial Heterogeneity to Trigger Bridging in Secondary Bonded Composite Joints: An Efficient Strategy to Introduce Crack-Arrest Features," Composites Science and Technology, Dec. 24, 2019, vol. 188, 107964, pp. 1-11, Elsevier Ltd.

Written Opinion of the International Searching Authority in corresponding/related International Application No. PCT/IB2020/062128, date of mailing Apr. 30, 2021.

*Primary Examiner* — Jessica M Roswell

(74) *Attorney, Agent, or Firm* — PATENT PORTFOLIO BUILDERS PLLC

(57) ABSTRACT

A self-standing adhesive layer is configured to join a first adherend to a second adherend, with no additional adhesive. The adhesive layer includes a material that self-stands and is configured to adhere to the first and second adherends; a first surface of the material is opposite to a second surface of the material; a first area of the first surface has a first smoothness and/or morphology and/or adhesion properties; and a second area of the first surface has a second smoothness and/or morphology and/or adhesion properties, different from the first smoothness and/or morphology and/or adhesion properties. The first and second areas form a preset pattern on the first surface.

17 Claims, 31 Drawing Sheets

| Adhesive material | Adhesive thickness (mm) | $G_I$ (N/mm) | $G_{II}$ (N/mm) | $G_I/G_{II}$ |
|---|---|---|---|---|
| Epoxy (AV138) | 0.5 | 4.91 | 14.2 | |
| Epoxy (Araldite 2015) | 0.2 | - | 7.22 | - |
| Epoxy (Araldite 2015) | 0.5 | 0.53 | 11.9 | 22.6 |
| Epoxy (Araldite 2015) | 1 | - | 21.1 | - |
| Epoxy (Araldite 2015) | 0.2 | 0.43 | 4.70 | 10.9 |

FIG. 1

| **Surface pretreatment** | **LC** | **LA** |
|---|---|---|
| Laser wavelength (µm) | 10.6 | 10.6 |
| Focal distance (mm) | 50 | 50 |
| Spot diameter (µm) | 200 | 200 |
| Laser speed (mm/s) | 500 | 500 |
| Pulse frequency (kHz) | 20 | 20 |
| Processing gas (-) | Air | Air |
| Average power (W) | 7.5 | 22.5 |
| Pulse fluence (J/cm$^2$) | 1.2 | 3.6 |

FIG. 3

| Label | Treatment | Pattern width W (mm) | Adhesive thickness (mm) |
|---|---|---|---|
| LA-T008 | LA | - | 0.8 |
| LA-T002 | LA | - | 0.2 |
| LC-T008 | LC | - | 0.8 |
| P250-T008 | LA + LC | 2.5 | 0.8 |
| P500-T008 | LA + LC | 5.0 | 0.8 |
| P500-T002 | LA + LC | 5.0 | 0.2 |
| P1000-T008 | LA + LC | 10.0 | 0.8 |

$a_{eff}$-GII (LA-T008)

$a_{eff}$-GII (LC-T008)

$a_{eff}$-GII (P500-T008)

| Label | $P_{max}$(N) | $G_{IIi}$ (N/mm) | | $G_{IIc}$ (N/mm) | |
|---|---|---|---|---|---|
| | | SBT | TBT | SBT | TBT |
| LA-T008 | 1256 ± 55 | 0.81 ± 0.15 | 0.55 ± 0.19 | 8.82 ± 0.81 | 8.34 ± 0.43 |
| LA-T002 | 737 ± 68 | 0.41 ± 0.22 | 0.35 ± 0.25 | 2.49 ± 0.30 | 2.39 ± 0.21 |
| LC-T008 | 1312 ± 21 | 1.05 ± 0.24 | 0.87 ± 0.17 | - | - |
| P250-T008 | 1345 ± 92 | 0.71 ± 0.13 | 0.63 ± 0.35 | 10.92 ± 0.55 | 10.64 ± 0.52 |
| P500-T008 | 1443 ± 76 | 0.45 ± 0.21 | 0.58 ± 0.27 | 11.29 ± 0.76 | 11.28 ± 1.12 |
| P1000-T008 | 1560 ± 47 | 1.02 ± 0.09 | 0.84 ± 0.15 | 14.1 ± 0.40 | 13.8 ± 0.84 |
| P500-T002 | 806 ± 87 | 0.91 ± 0.35 | 0.84 ± 0.18 | 3.11 ± 0.44 | 2.84 ± 0.39 |

FIG. 17

METHOD TO IMPROVE TOUGHNESS OF ADHESIVELY BONDED COMPOSITE JOINTS

CROSS-REFERENCE TO RELATED APPLICATIONS

This application is a U.S. National Stage Application of International Application No. PCT/IB2020/062128, filed on Dec. 17, 2020, which claims priority to U.S. Provisional Patent Application No. 62/957,905, filed on Jan. 7, 2020, entitled "METHOD TO IMPROVE TOUGHNESS OF ADHESIVELY BONDED COMPOSITE JOINTS USING LASER-BASED SURFACE PATTERNING TECHNIQUE," the disclosures of which are incorporated herein by reference in their entirety.

BACKGROUND

Technical Field

Embodiments of the subject matter disclosed herein generally relate to secondary bonded joints and a method for enhancing the toughness of the secondary bonded joints, and more particularly, to a method of patterning either one or both of the adherends of the joints, and/or only the adhesive layer that is placed between the two joints, to generate a pattern/spatial distribution of morphological properties (smoothness/roughness) and adhesion properties (strength/toughness) over the adherent/adhesive interface.

Discussion of the Background

Most of the existing composite structures (e.g., wings of an airplane, or blades of a wind turbine) are made by joining various parts, which are manufactured separately. Mechanical fastening, welding and adhesively bonding are the most common ways for joining these parts. The traditional fasteners usually require drilling holes into the structure of these parts and applying different machining processes, which might cause initial internal damages to the composite parts, such as matrix cracks and delaminations. Moreover, cutting the fibers of these parts causes a decrease in the load carrying capacity of the parts, requiring extra material, which increases the final structural weight.

Thus, bonded joints are increasing alternatives to the mechanical joints in engineering applications due to their advantages over the conventional mechanical fasteners. Among these advantages are lower stress concentrations and therefore an increase strength-to-weight efficiency, and improved damage tolerance. In adhesive bonding, an adhesive is placed between the adherend surfaces and no holes are made into the adhered parts.

The application of these joints in structural components made of fiber-reinforced composites has increased significantly in recent years. However, surface preparation of the adherends prior to bonding is a major concern that affects and limits the performance of the bonded joints. Moreover, the catastrophic failure of these joints limits their application as the primary joining technique for structural applications. The main cause of catastrophic failure is the lower toughness of the adhesive-adherend interface at which the crack is initiated. Once the crack is initiated, it propagates very rapidly causing a catastrophic failure of the entire part.

To this end, efforts are made to arrest crack propagation, improve the adhesive-adherend interface toughness, and avoid catastrophic failure of these joints. Several surface preparation methods including sandpaper roughening, grit blasting, and peel-ply [1-3] have been developed to improve the adherend-adhesive interface toughness. The first two methods are efficient for increasing the adherend surface roughness and removing contaminants from the surfaces, resulting in better bonding and higher joint strength. However, since both methods are manual operations, the strength of the produced joints vary over a wide range, which reduces the reliability of the joint. Moreover, both techniques are not environment friendly since they produce dust, which is dangerous when operating on carbon fiber reinforced composites. Additionally, damage might occur to the carbon fibers at the surface of the adherents, which negatively affects the joint's strength. The third method, i.e., the peel-ply, is used to overcome the shortage of the former two methods by generating a relatively rough surface. However, this technique should be applied before the laminate's curing, which reduces its applicability for real large structures, and, in addition, it causes non-uniformly distributed contaminates coming from the technical fabric that might negatively affect the interface toughness [2].

With the goal of improving the fracture toughness, several proposals have been presented including making the adherends in mold corrugation, z-pinning and stitching, and improving the resin properties using different additives and thermoplastic inclusions. Mold corrugation is efficient for interface toughness improvement. However, this technique requires molding of carbon fiber reinforced polymer (CFRP) in a special mold during the lamination process, which is not an easy task due to the formation of the resin rich area at the corners of the corrugation. Z-pinning and stitching are applied to the laminate during the curing process, which is not valid for the secondary bonding. Additionally, due to the fiber waviness occurring because of the presence of the z-pins, the in-plane strength and stiffness are negatively affected. Energetic techniques such as femtosecond, UV and $CO_2$ laser treatment are gaining acceptance in the adherend surface treatment [4, 5]. The acceptance of these techniques has recently increased as they are easily automated methods and ecofriendly. In this regard, previous work of the inventors demonstrated the effectiveness of the $CO_2$ laser treatment for generating extrinsic damage mechanisms which improve mode I fracture toughness [6, 7]. The mode I fracture is defined herein as being the fracture that is generated when the two adherends are pulled apart from each other.

For the above noted methods, the data available in the literature with regard to the fracture toughness is mainly focused on the mode I fracture toughness ($G_I$), which is measured using the double cantilever beam test. However, the bonded joints discussed here are also subjected to mode II ($G_{II}$) and mixed mode load cases. The mode II is defined herein as being the mode occurring when the two adherends of the joint experience in-plane shearing. Due to the difficulty of the test stability, the mode II $G_{II}$ is less considered in the literature and a rough assumption is considered in finite element (FE) simulation by considering the ratio $G_{II}/G_I$=2 to 5. Additionally, in FE simulations for design purposes, the value of the $G_{II}$ for a joint with a given adhesive thickness is used to design another joint with a different adhesive thickness. The table in FIG. 1 shows the values of the $G_I$ and $G_{II}$ for different adhesive joints available in the literature. It can be seen the very large range of the $G_{II}/G_I$ ratios and the high dependence of the $G_{II}$ on the adhesive thickness.

Therefore, there is a need for a method to produce bonded joints that have an improved mode II fracture toughness and address the adhesive thickness of the bonded joints.

BRIEF SUMMARY OF THE INVENTION

According to an embodiment, there is a self-standing adhesive layer configured to join a first adherend to a second adherend, with no additional adhesive. The adhesive layer includes a material that self-stands and is configured to adhere to the first and second adherends; a first surface of the material is opposite to a second surface of the material; a first area of the first surface has a first smoothness and/or morphology and/or adhesion properties; and a second area of the first surface has a second smoothness and/or morphology and/or adhesion properties, different from the first smoothness and/or morphology and/or adhesion properties. The first and second areas form a preset pattern on the first surface.

According to another embodiment, there is a method for making a self-standing adhesive layer that is configured to join a first adherend to a second adherend with no additional adhesive. The method includes providing a material that self-stands and is configured to adhere to the first and second adherends, wherein a first surface of the material is opposite to a second surface of the material; applying a first treatment to a first area of the first surface to generate a first smoothness and/or morphology and/or adhesion properties; and applying a second treatment to a second area of the first surface to generate a second smoothness and/or morphology and/or adhesion properties, different from the first smoothness and/or morphology and/or adhesion properties. The first and second areas form a preset pattern on the first surface.

According to yet another embodiment, there is a method for improving a mode II toughness of a joint, and the method includes providing a first adherend panel; providing a second adherend panel that needs to be joined to the first adherend panel; applying a first surface treatment to a first area of a surface of the first adherend panel; applying a second surface treatment to a second area of the surface of the first adherend panel, wherein the second surface treatment is different from the first surface treatment; placing an adhesive layer in direct contact with the first area and the second area; placing the second adherend panel over the adhesive layer; and pressing the first adherend panel, the adhesive layer, and the second adherend panel to form the joint. The first area follows a first pattern and the second area follows a second pattern.

BRIEF DESCRIPTION OF THE DRAWINGS

Fora more complete understanding of the present invention, reference is now made to the following descriptions taken in conjunction with the accompanying drawings, in which:

FIG. 1 shows the mode I and II toughness values for various adhesive materials having a variety of thicknesses;

FIG. 3 shows various parameters that characterize a laser beam that is used to apply a surface treatment to one or both adherend panels of the joint;

FIG. 13 illustrates characteristics of various joints formed with one or two surface treatments and various widths;

FIG. 17 illustrates the mode I and mode II toughness parameters of some of the joints discussed herein;

DETAILED DESCRIPTION OF THE INVENTION

Figure 2:
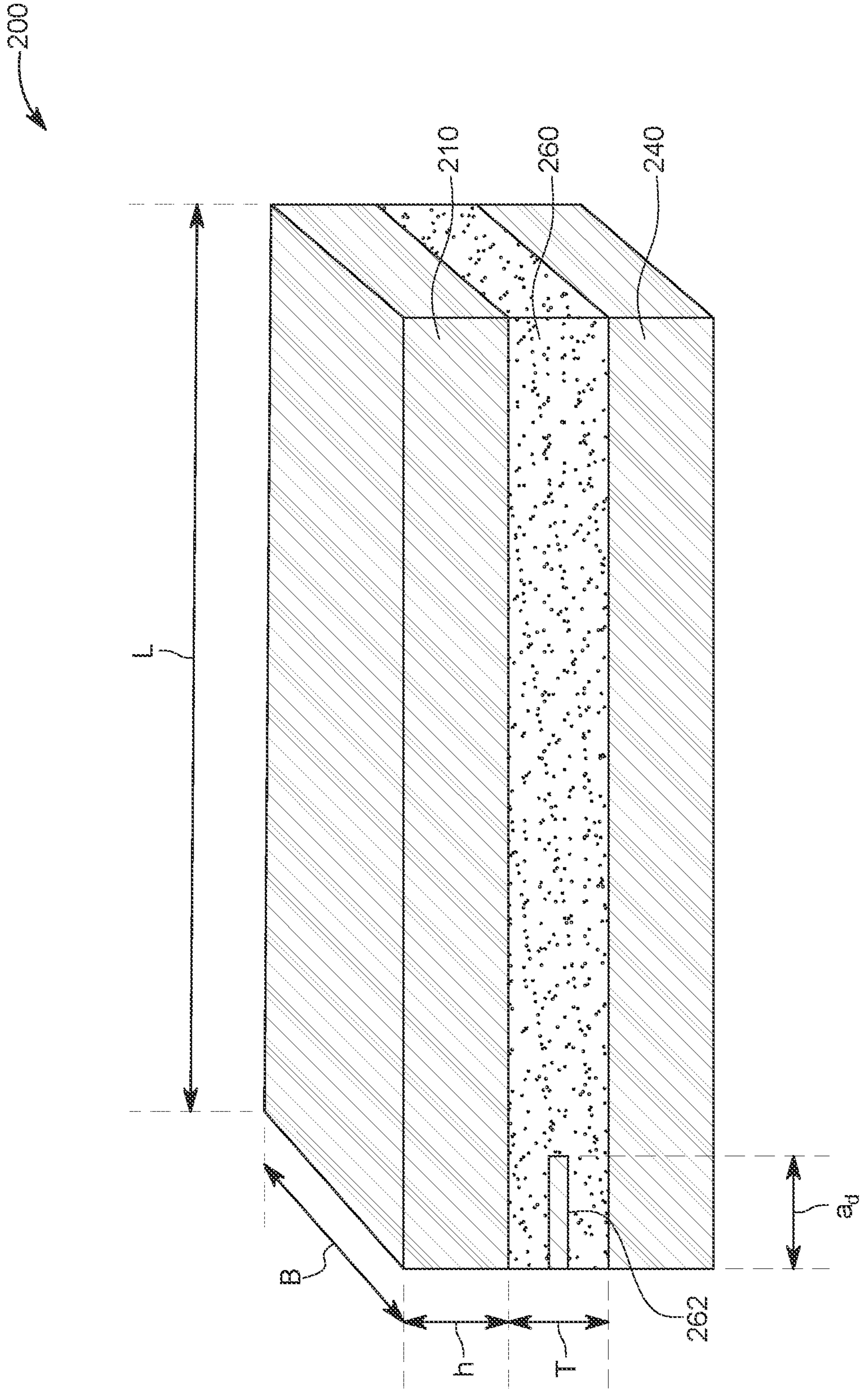
FIG. 2 illustrates a joint formed with two adherend panels and an adhesive layer.

The following description of the embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to a secondary bonded joint that uses two composite panels and an adhesive layer placed between the composite panels. However, the embodiments to be discussed next are not limited to two composite panels, but may be applied to other structures.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an embodiment, a novel method is introduced for activating new dissipation damage mechanisms that help improve the mode I, II or III fracture toughness, based on patterning one or more of the adherend surfaces and/or by patterning the adhesive layer that is placed between the adherend panels. In one embodiment, the surface patterning of the adherend panels and/or the adhesive layer is achieved with low and high energy $CO_2$ laser treatment. By alternatively applying the low and high energy to one or more of the adherend panel's surfaces, a repeated pattern of rough and smooth areas are obtained over the adherend panel's surfaces. These two types of surfaces might also be associated with different fracture properties such as strength and toughness. The same or different methods (laser, plasma, irradiation, sanding, torch, grinding, grit blasting, etching or SAM deposition or any technique allowing to design a contrast in space of adhesive properties) may be used for achieving a pattern of properties (morphology, roughness and/or adhesive strength) on the adhesive layer. An End Notched Flexural test (ENF) was performed to apply out-of-plane loading to the bonded CFRP substrates (or adherend panels) while two data reduction methods based on simple and Timoshenko beam theories were used to characterize the $G_{II}$ from the obtained experimental load-displacement curves. X-Ray micro-computed tomography (μ-CT) was used to inspect the damage inside the tested samples for identification of different energy dissipation mechanisms. The obtained μ-CT micrographs were correlated with the load-displacement behavior of the different samples enabling constructing schematic diagrams of damage sequences in the adhesive bonded joints with laser patterned adherend surfaces. Two different adhesive thicknesses were considered, 0.2 and 0.8 mm, which are typical for aerospace and civil applications, to check the validity of the proposed strategy on thin and thick adhesive thicknesses. However, the methods discussed herein can be applied to any adhesive layer thickness.

The inventors have discovered that a surface treatment following a given pattern for one or more surfaces of the adherend panels and/or adhesive layer are effective in improving the fracture toughness in mode I and mode II, as now discussed. A joint 200 having two adherend panels 210 and 240 are connected to each other with an adhesive layer 260 as shown in FIG. 2. The adhesive layer may include any one of a thermoset adhesive film (e.g., thickness between 20 to 500 microns) delivered as a constant thickness film typically used for secondary bonding of structures, a thermoplastic adhesive film, or a classical double-sided adhesive tape (scotch-like tapes) made of a special glue on a polymeric "core." The adherend panels may include any one of a composite, metallic, ceramic, polymer, concrete, etc. The adherend panels 210 and 240 were manufactured for this embodiment using a unidirectional (UD) tape prepreg carbon/epoxy with fiber volume fraction of 60.8%. The laminate used for making the two adherend panels is composed of 8 unidirectional plies [0° ] with 0.25 mm ply thickness and 2 mm nominal laminate thickness. Panels having an area of 300×300 $mm^2$ were manufactured using a hand lay-up technique and they were cured using a compression molding process. The compression molding process was applied using a hydraulic hot plate press machine at 7 bar pressure, for 2 h at 180° C. The heating and cooling rates were kept constant at 3° C./min. The laminates were cured over a peel-ply layer to generate a surface of large roughness. The elastic ply properties were characterized following ASTM standards and reported as: $E_{11}$=135±6 GPa for the longitudinal modulus of elasticity, $E_{22}$=8.75±0.27 GPa for the transverse modulus, $G_{12}$=4.93±0.14 GPa for the in-plane shear modulus, and $\upsilon_{12}$=0.29±0.01 for the longitudinal Poisson's ratio.

The adherend panels 210 and 240 for the ENF test were cut from the obtained laminate panel using an abrasive water jet machine. The edges of the adherend panels 210 and 240 were trimmed and each adherend panel was divided into sub panels of 260×90 $mm^2$, the major dimension being aligned with the 0° direction. In this embodiment, the surface of the adherend panels were treated using a $CO_2$ laser, as will be explained in the next section. However, it is noted that the surface of the one or two adherend panels may also be treated by other means, e.g., mechanical means (sanding, griding, grit blasting), thermal means (plasmas, torch, laser, UV, e-beam, any kind of irradiation that changes the morphology and/or adhesion properties of the surface), chemical means (exposure to an acid, etching, non-sticking products, etc.), or irradiation means (e.g., a X rays), or texturing using a mold, which may be configured to generate the desired surface treatment. After treatment, the adherend panels 210 and 240 were submerged in acetone for 10 min, dried at 60° C. for 30 min and cleaned using compressed air to remove any contaminants on adherend panels' surfaces.

The two adherend panels 210 and 240 were bonded together using an epoxy adhesive layer 260 (e.g., Araldite 420, but other polymers or chemicals having bonding properties may be used) with 36 MPa in-plane strength, and 1.5 GPa in-plane modulus, as provided by the manufacturer, to form a test campaign of three samples with a width B=25 mm and length L=260 mm. A thickness of the adherend panels 210 and 240 is h. The various samples made with these adherend panels were bonded with the adhesive layer 260 having two thicknesses T, 0.8 and 0.2 mm. These are standard thicknesses used in the art. The embodiments discussed herein can be applied to any thickness T. After bonding, the various samples are cured at 60° C. for 3 hours and kept 24 hours at room temperature. To initiate the crack for laboratory testing, a pre-crack of length $a_d$=5 mm was generated using a non-adhesive polyethylene insert 260 of 18 μm thickness. Finally, the bonded adherend panels 210 and 240 were cut into three samples, each of 25 mm width to fit the ENF samples requirement.

In one embodiment, prior to bonding the two adherend panels 210 and 260 to each other, a surface treatment (chemical, mechanical, wave based, etc.) was applied to one or both panels to generate a predefined surface patterning over at least one adherend panel's surface. Generating patterns on the adherend panel's surface was found to arrest the crack propagation at the adherend-adhesive interface (local energy dissipation) and allow generating other energy dissipation mechanisms inside the adhesive layer. Some of these mechanisms, as discussed later, appear to be non-local, allowing the exploit of the dissipative properties of the adhesive layer, or the creation of bridging ligaments between the bottom and top adherents.

In this embodiment, the peel-ply surface of the adherend panels 210, 240 was subjected to a laser treatment using $CO_2$ pulsed laser irradiation (e.g., a wavelength λ=10.6 μm, but other wavelengths may be used). The main parameter guiding the efficiency of the laser irradiation process is the pulse fluence $F_p$, which is defined as follows:

$$F_p = I_p \cdot t_p = \frac{W_{ave}}{f \cdot A_s} = \frac{4W_{ave}}{v \cdot PPI \cdot \pi d^2}, \quad (1)$$

where $I_p$ is the laser irradiance, $t_p$ stands for the laser pulse duration, v is the traveling speed, PPI represents the number of pulses per inch, f=v·PPI is the pulse frequency, $W_{ave}$ is the average pulse power, and $A_s=\pi d_2/4$ is the spot size of the laser. Previous investigations revealed that the surface morphology and energy varied for different pulse fluences and frequencies [6, 7].

In the present embodiment, the traveling speed and the number of laser pulses were kept constant at v=500 mm/s and PPI=1000, respectively. The focal distance was optimized so that the resulting laser spot diameter was d=200 μm. Two different pulse fluence values were selected for two surface pretreatments, Laser Ablation (LA) and Laser Cleaning (LC). Based on previous work [6, 7], LC, whose fluence is $F_p$=1.2 J/cm$^2$, achieved a slightly cleaned surface without modifications in the surface roughness of the adherend panels 210, 240. The LA surface pretreatment employed a higher pulse fluence, e.g., $F_p$=3.6 J/cm$^2$, and fully removed the surface resin and exposed the underlying carbon fibers of the adherend panels. The processing parameters of the LA and LC treatments used in this embodiment are listed in the table in FIG. 3. Note that other laser fluences may be used as long as they generate two different surface smoothness and/or morphologies and/or adhesion properties in one surface of the adherend panel.

While the present embodiment used a laser beam for which only its fluence was changed (all other laser's parameters were the same as illustrated in the table in FIG. 3) to generate the two surface treatments LA and LC, it is possible to also achieve two different surface treatments by using other values for the laser fluence. When using different laser fluences in different areas, one laser fluences might expose the fibers while the other one does not, but this is not mandatory. The inventors have also found that the method may be applied with treatments that do not expose the fibers, all treatments exposes the fibers, or only some of the treatments exposes the fibers. In one application, it is possible to maintain constant the laser fluence and change the laser speed to obtain two different surface treatments (e.g., a first speed of 500 mm/s for the LA and 1000 mm/s for the LC). In still another application, it is possible to change the focal distance or the spot diameter or the pulse frequency of the laser beam to achieve two different surface treatments. In yet another embodiment, it is possible to use the laser beam for one surface treatment and another means (e.g., mechanical, chemical, etc.) to obtain the other surface treatment. In still another embodiment, it is possible to implement more than two different surface treatments. In one application, it is possible to use a first laser type for the first surface treatment and a second laser type for the second surface treatment. Yet in another embodiment, it is possible to manufacture the first adherend panel to have a first surface smoothness and to manufacture the second adherend panel to have a second surface smoothness, different from the first surface smoothness. In yet another application, it is possible that the first adherend panel is manufactured to have regions with two or more surface smoothness while the second adherend panel is manufactured to also have two or more surface smoothness, different from the first adherend panel. Note that the term "smoothness" can be replaced for the embodiments described herein with the terms "morphology" and/or "adhesion properties." For simplicity, the embodiments are discussed only with regard to the term "smoothness."

Figure 4:
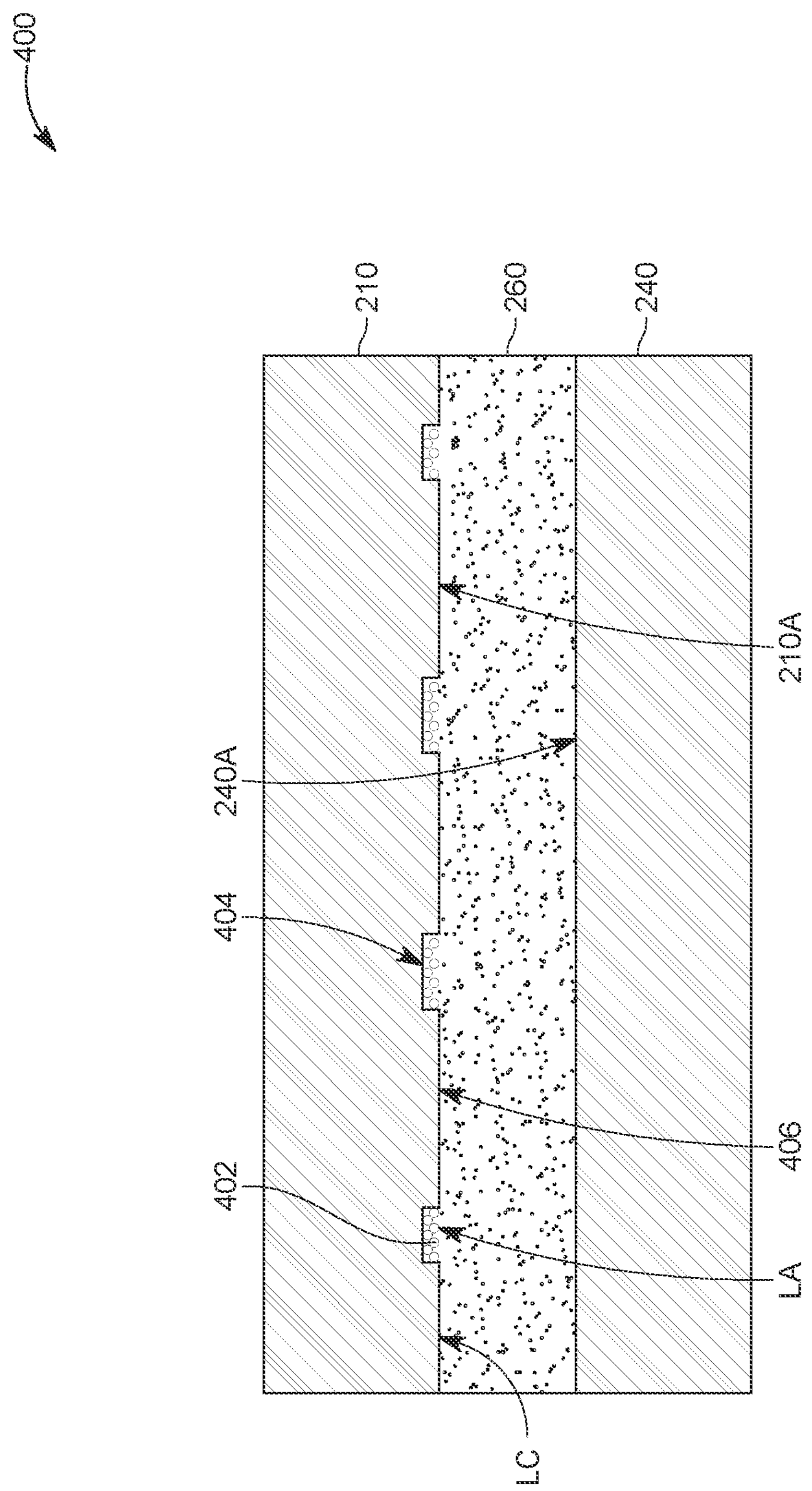
FIG. 4 shows a joint formed with two adherend panels and an adhesive layer, where the surface of one of the adherend panel is patterned with different surface treatments.

Returning to the embodiment in which the laser fluence is changed to achieve the first and second surface smoothness, it is possible to alternately apply the treatments LA and LC to only one adherent panel of a joint 400, as illustrated in FIG. 4. Note that FIG. 4 shows that the LA surface treatment exposes the fibers 402 of the areas 404 of the adherend panel 210 while the fibers of the areas 406 are not exposed, e.g., because the LC treatment or similar treatment was applied to the areas 406. Although FIG. 4 shows only the surface 210A of the panel 210 being treated to have the two surface treatments LA and LC, in one embodiment it is possible that only the internal surface 240A of the adherend panel 240 receives this treatment.

Figure 5:
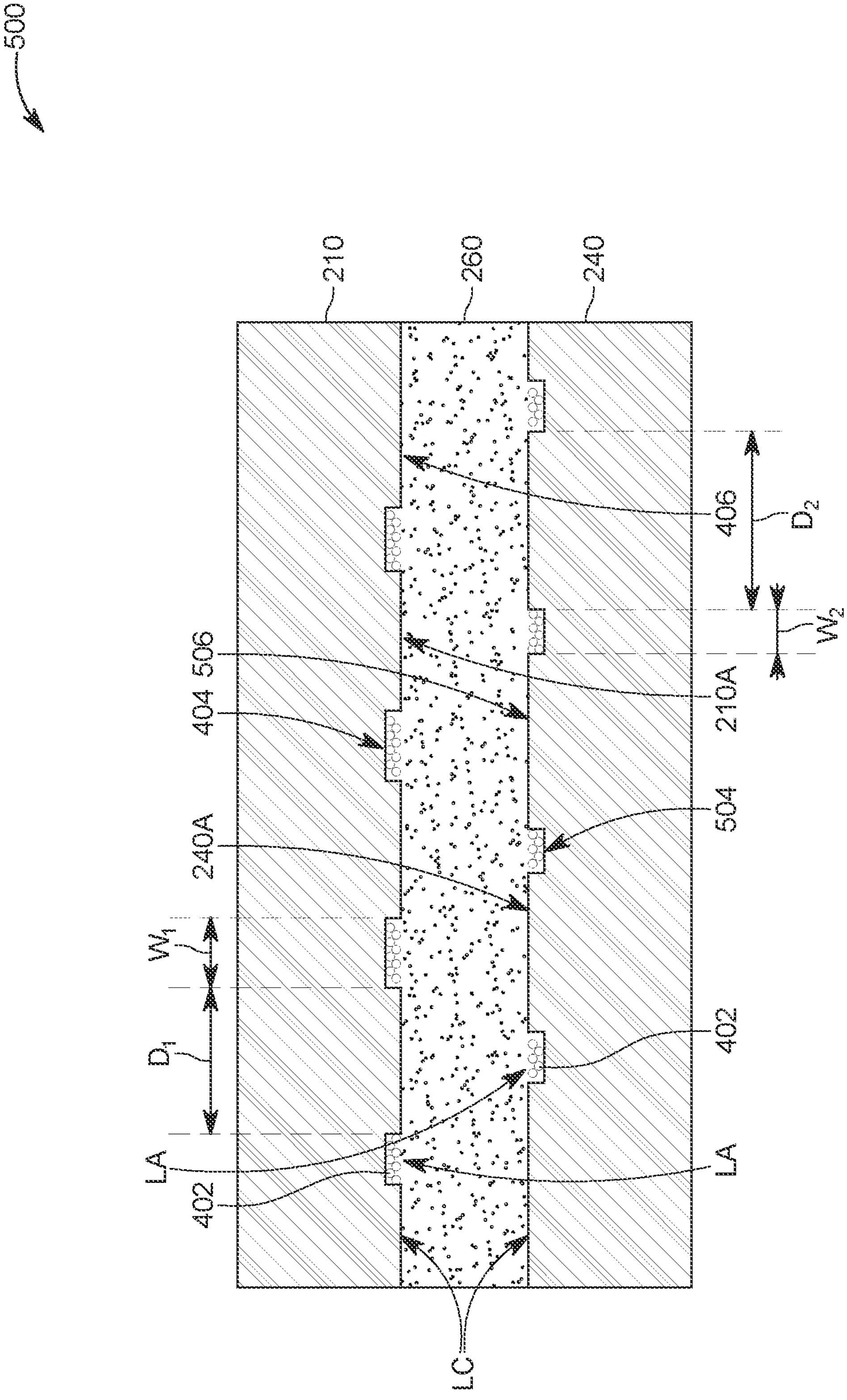
FIG. 5 shows a joint formed with two adherend panels and an adhesive layer, where the surfaces of both of the adherend panels are symmetrically patterned with different surface treatments.

In another embodiment as illustrated in FIG. 5, it is possible that both internal surfaces 210A and 240A of a joint 500 receive the surface treatments LA and LC noted above. More specifically, FIG. 5 shows the areas 404 of the LA treatment for the first adherend panel 210 and the areas 504 of the LA treatment for the second adherend panel 240. FIG. 5 also shows the areas 406 of the LC treatment for the first adherend panel 210 and the areas 506 of the LC treatment for the second adherend panel 240. The width W1 of the areas 404 may be different from the width W2 of the areas 504. However, in one embodiment W1=W2. A distance D1 between two adjacent areas 404 may be different from a distance D2 of the areas 504. However, in one embodiment D1=D2. In yet another embodiment, W1=W2 and D1=D2. The distances D1 and D2 may be around 5 mm (between 1 and 10 mm) and the widths W1 and W2 may be between 1 and 20 mm (e.g., 2.5, 5.0, and 10.0 mm). The same configurations may be implemented for the areas 406 and 506.

Figure 6:
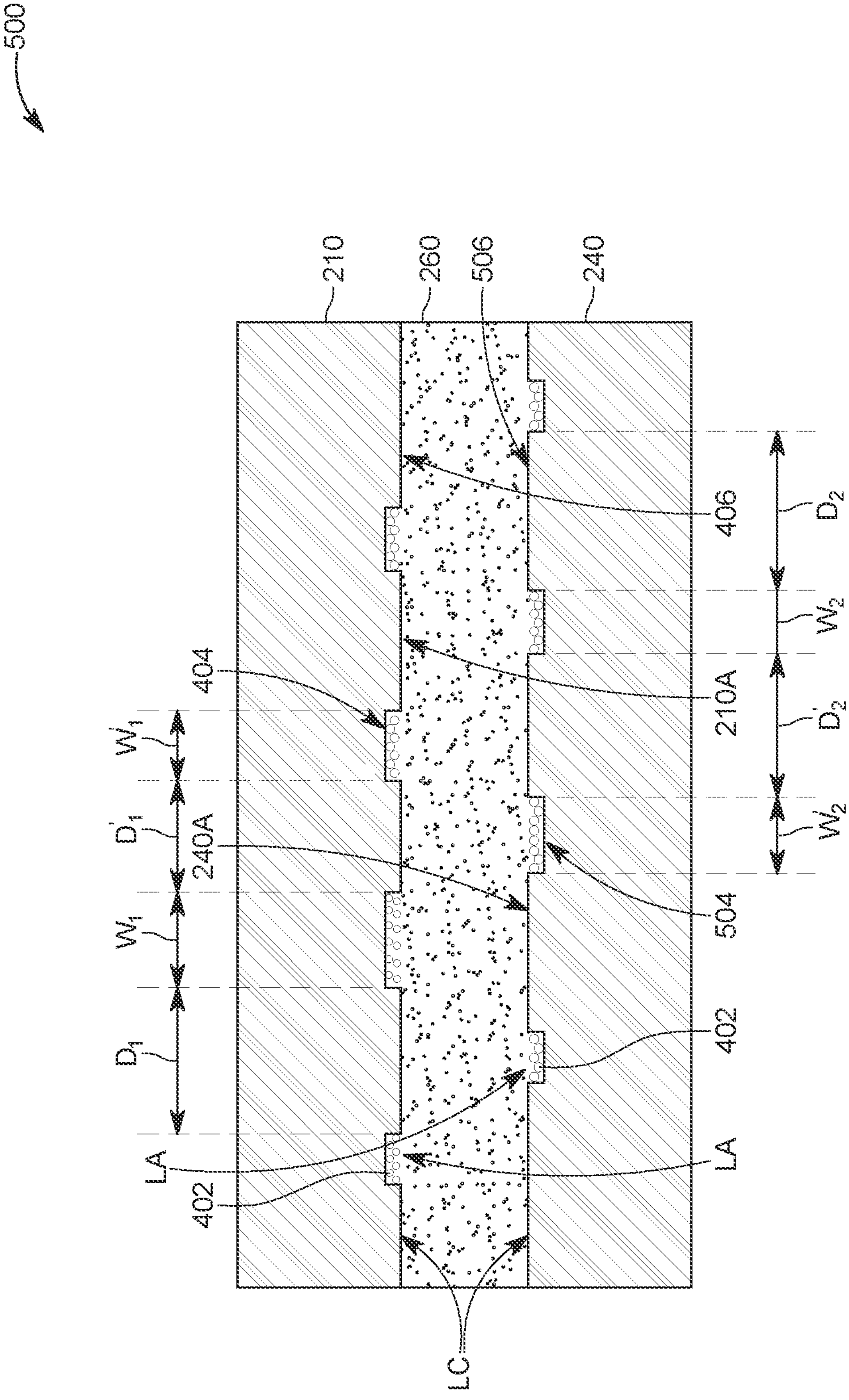
FIG. 6 shows a joint formed with two adherend panels and an adhesive layer, where the surfaces of both of the adherend panels are asymmetrically patterned with different surface treatments.

The areas 404 and 504 are selected so that they do not overlap with each other, i.e., no area 404 is directly facing an area 504 (assuming that the adhesive layer 260 is not present). In other words, the areas 404 and 504 are interleaved so that the area 404 is facing a corresponding area 506 and an area 504 is facing a corresponding area 406. In the embodiment shown in FIG. 5, the distances D1 and D2 are the same and constant along the internal surfaces 210A and 240A, and the widths W1 and W2 are the same and constant along the internal surfaces of the adherend panels. However, these distances and/or widths can vary along the internal surfaces, as shown in FIG. 6.

Figure 7A:
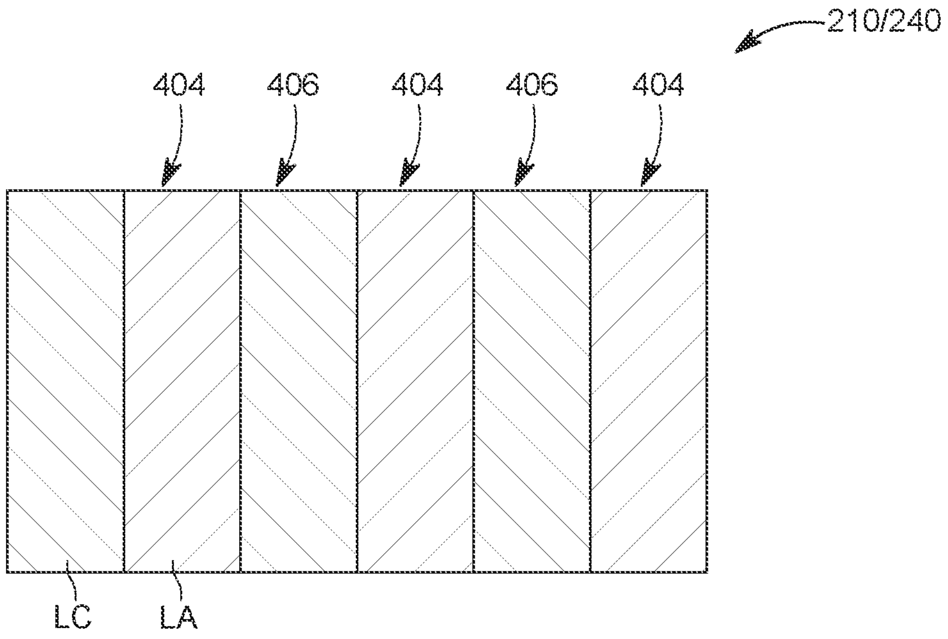
FIGS. 7A to 7E illustrate various shapes and sized of the regular patterned surfaces.
Figure 7B:
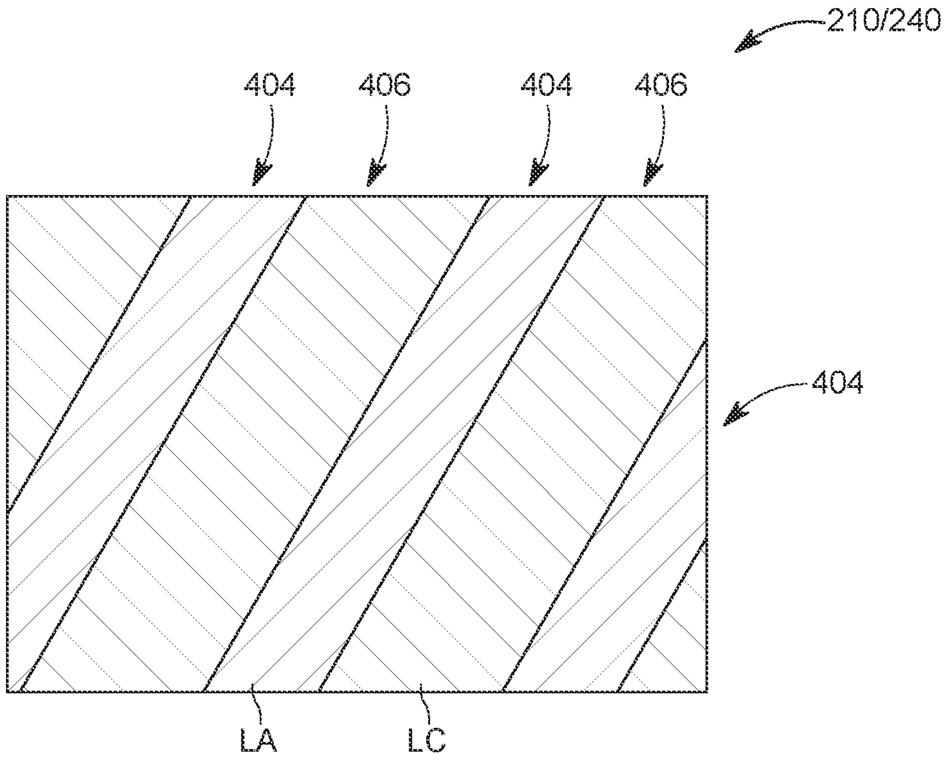

The shapes of the areas 404, 406, 504 and 506 can be regular or irregular. If the shapes are regular, then a regular pattern is obtained. If the shapes are irregular, then an irregular pattern is obtained. FIG. 7A shows a regular pattern of (1) parallel stripes 404 having a first surface treatment (e.g., LA treatment) and (2) parallel stripes 406 having a second surface treatment (e.g., LC treatment). The same pattern can be implemented for the second adherend panel 240. FIG. 7B shows a similar pattern but the stripes are not perpendicular to the edges of the panels, as in FIG. 7A.

Figure 7C:
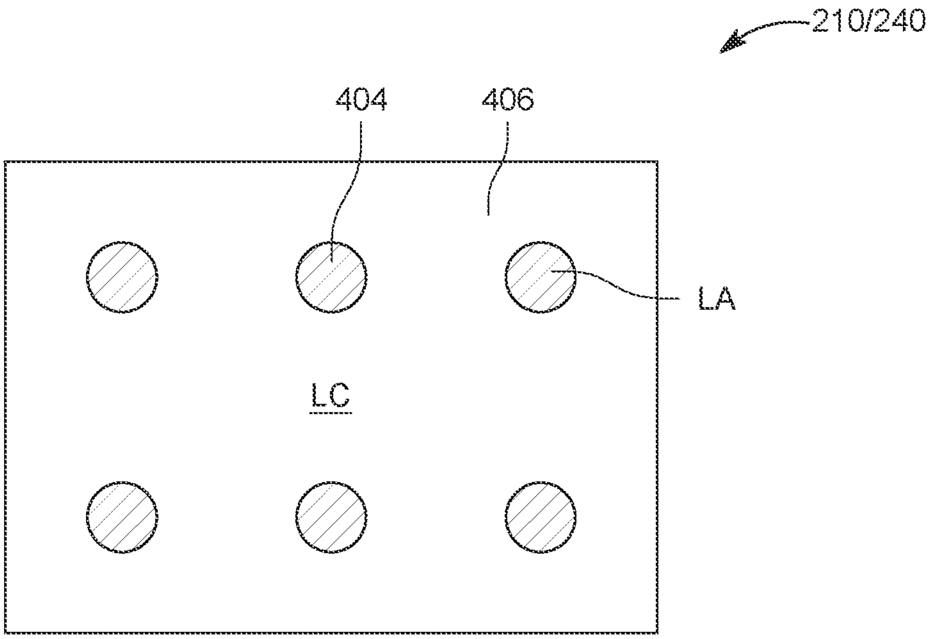
Figure 7D:
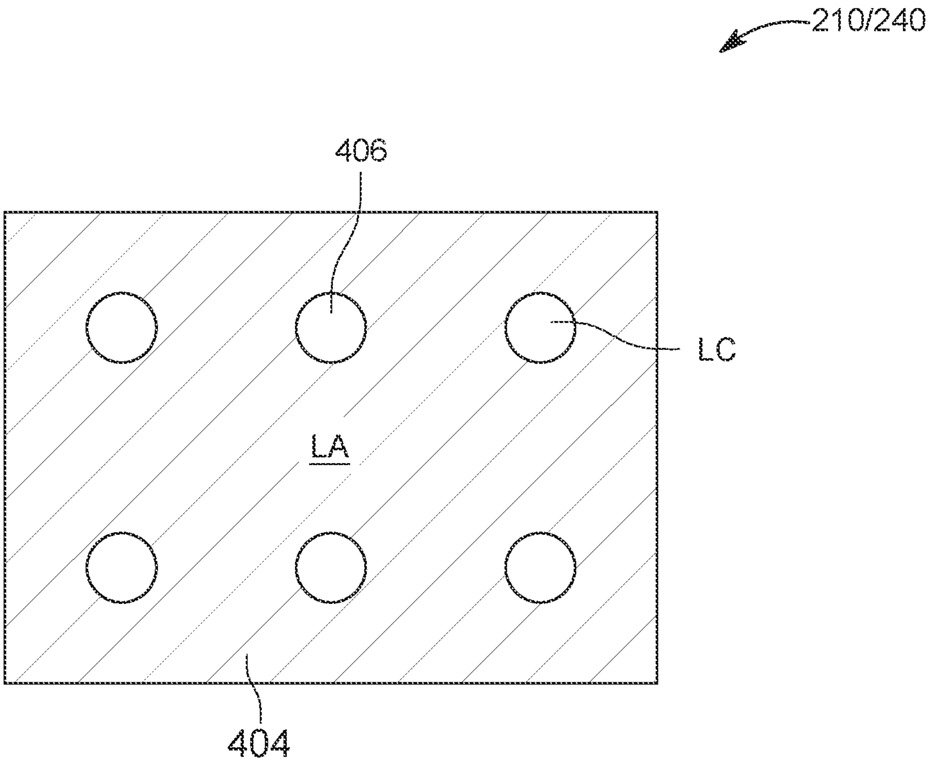
Figure 7E:
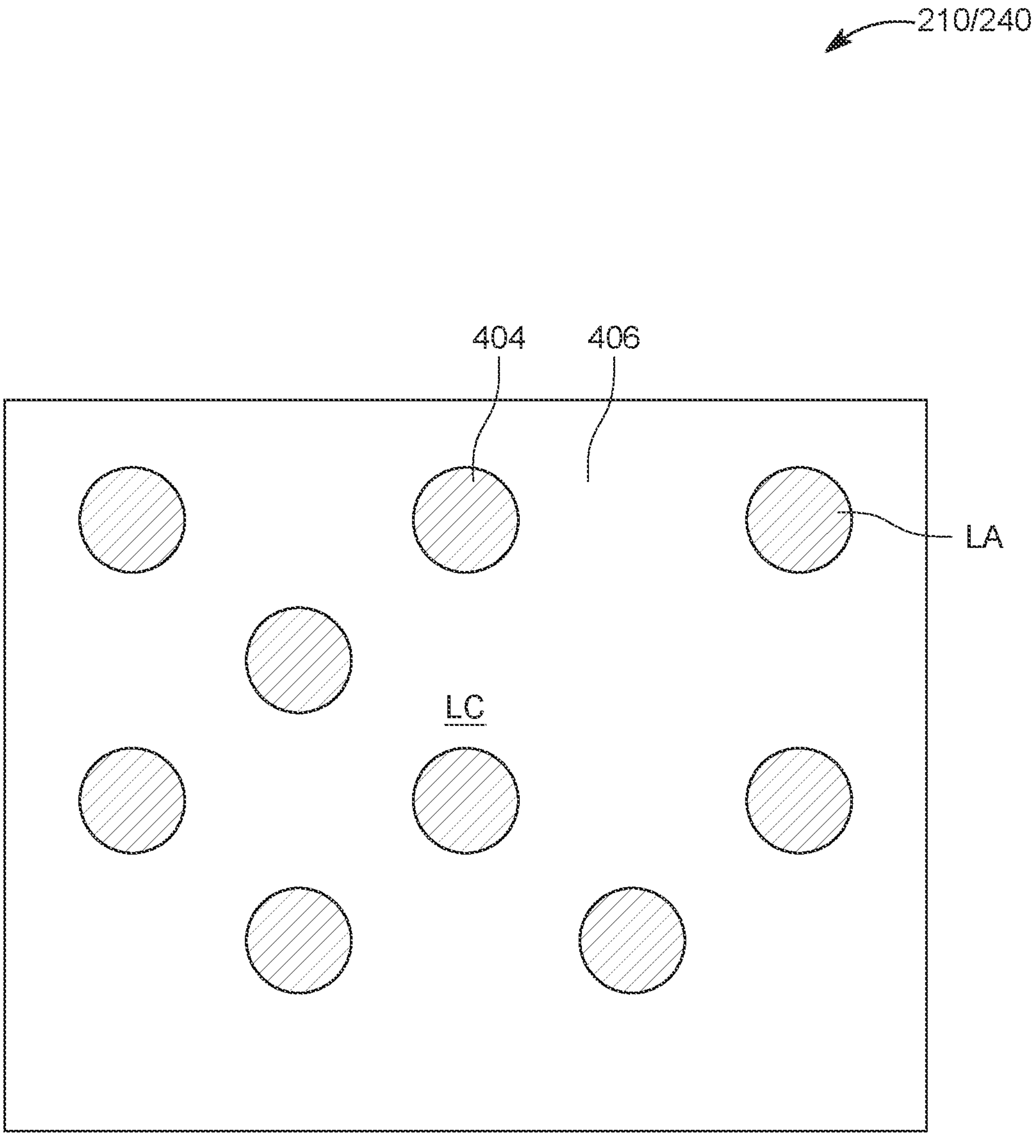

FIG. 7C illustrates a pattern in which the areas 404 are circular and areas 406 form a single continuous area, that fully encircles the areas 404. The areas 404 can be shaped to be square, rectangular, diamond, etc. FIG. 7D shows the areas 406 being circular and the areas 404 being a single continuous area, exactly the opposite of the pattern shown in FIG. 7D. FIG. 7E shows a similar pattern as in FIG. 7C, with the difference that the areas 404 are not distributed along lines that are perpendicular to the edges of the panel, but they make an angle that is different from 90 with the edges of the panel. Other regular patterns may be imagined.

Figure 8A:
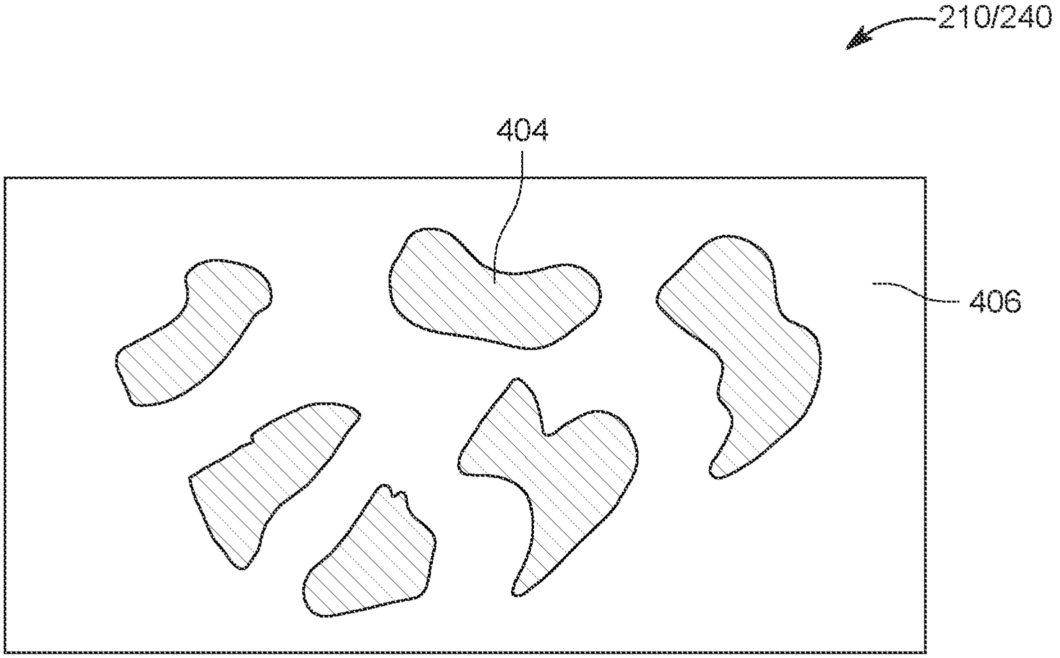
FIGS. 8A to 8C illustrate various shapes and sizes of the irregular patterned surfaces.
Figure 8B:
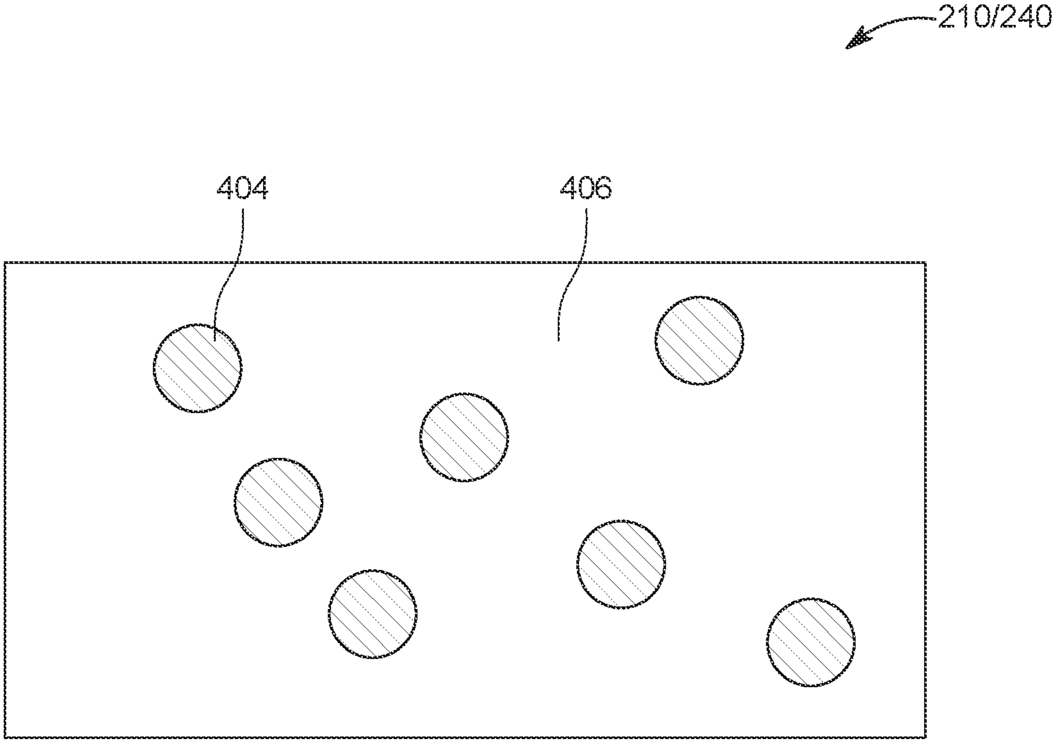
Figure 8C:
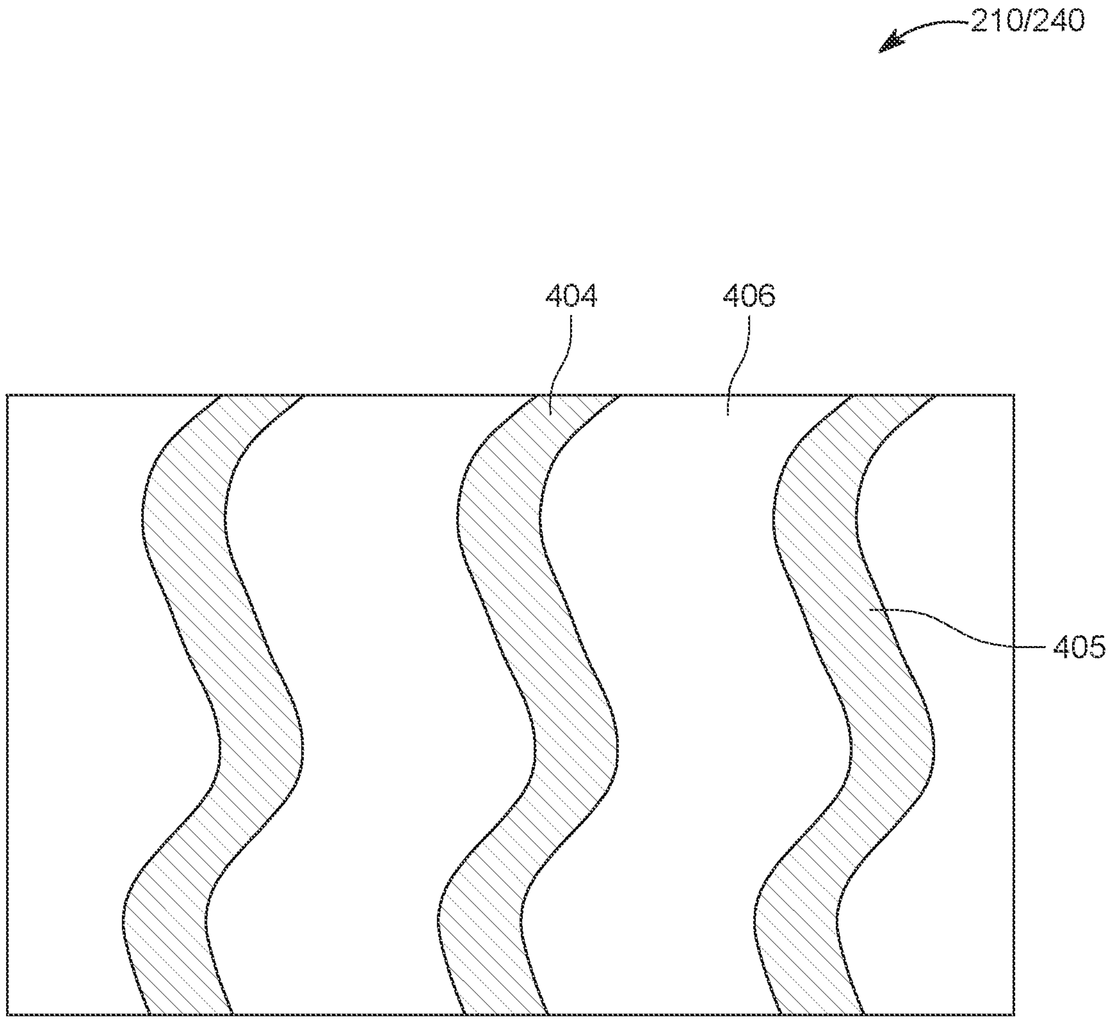

FIGS. 8A to 8C illustrate irregular patterns. FIG. 8A shows the areas 404 having a random shape and being randomly distributed over the panel 210 or 240, with the area 406 covering everything else, and fully enclosing the areas 404. The positions of the two areas can be switched. FIG. 8B shows the areas 404 having a regular shape, e.g., circle, square, rectangle, diamond, triangle, etc., but the areas 404 are randomly distributed over the surface of the panels. Also, the single area 406 fully encloses the areas 404. The positions of the two areas can be swapped. FIG. 8C shows the areas 404 having a wavy structure, e.g., one or two sides 405 of the area 404 following a sine or cosine curve, while areas 406 cover everything else of the surface of the panel(s). As discussed above, these patterns can be made in only one panel or in both panels 210 and 240.

Figure 9:
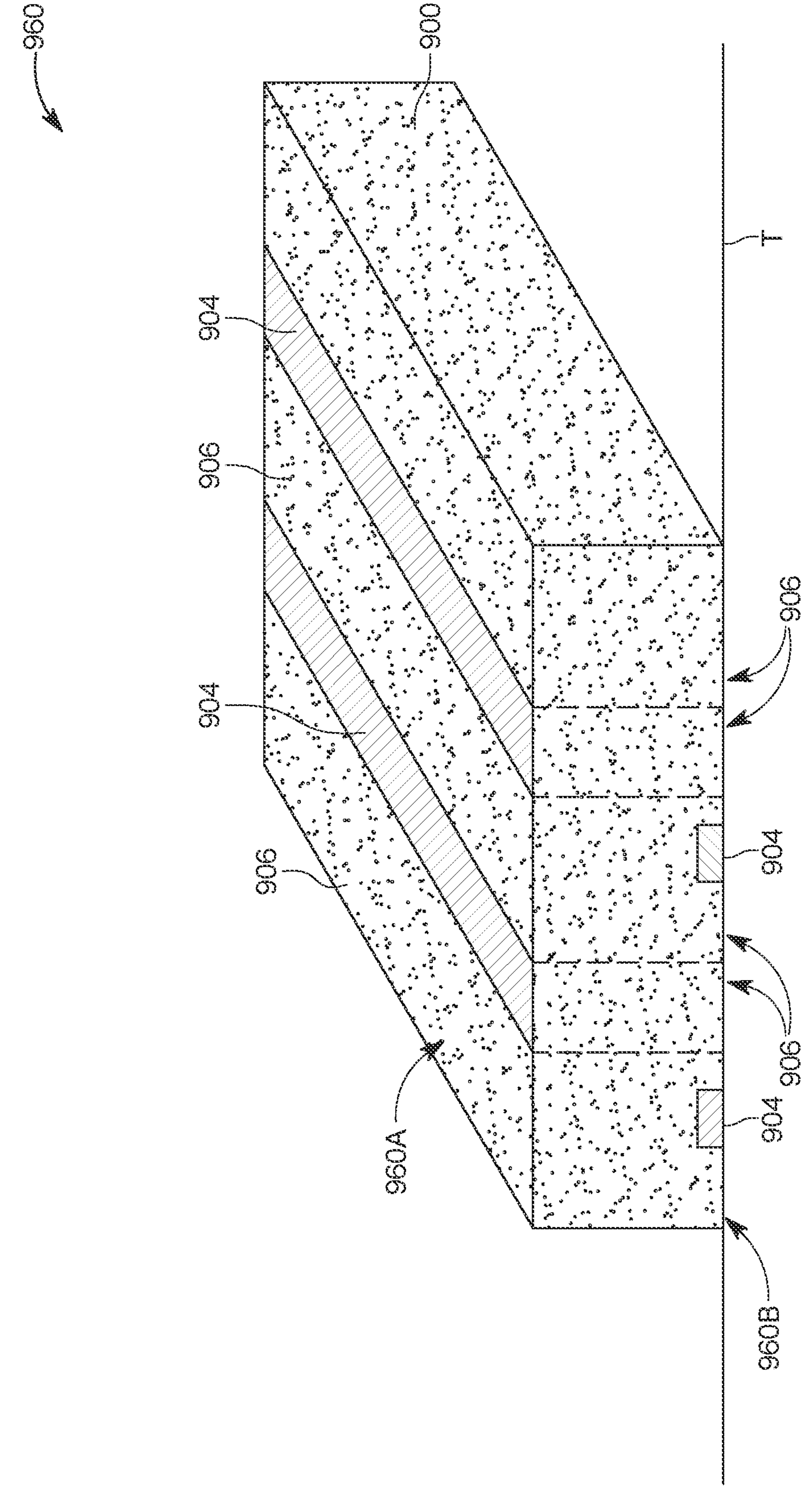
FIG. 9 illustrates a solid adhesive layer having two of its opposite surfaces patterned with at least two different treatments.

In one embodiment, instead of making the surface treatments into the surfaces of the adherend panels, as discussed in the previous embodiments, it is possible to make different surface treatments into the adhesive layer 260. For this embodiment, the adhesive layer is a solid layer, i.e., it is not a liquid adhesive. The term "solid" is defined herein to characterize an adhesive layer and to mean a material that is maintaining its shape by itself, before being placed between two adherend panels. In other words, a "solid adhesive layer" is a self-standing layer. If an adhesive is applied to one panel, and the adhesive is flowing, that is not a solid adhesive layer. The solid adhesive material may include any of the materials discussed above with regard to the layer 260. As shown in FIG. 9, a solid adhesive layer 960 maintains its shape when placed on a support T, and this is so due to the material 900 that makes the layer and not due to a covering material, or other support elements. Further, one or both surfaces 960A and 960B of the layer 960, which are facing the internal faces 210A and 240A of the first and second panels 210 and 240, can be patterned to have first areas 904 having a first surface treatment, and second areas 906 having a second surface treatment. The two surfaces 960A and 960B are flat in this embodiment. The two or more surface treatments are similar to the surface treatments discussed above with regard to the panels 210 and 240. Further, the location of the areas 904 and 906, their shape and size, their arrangement relative to the layer, are similar to those discussed above with regard to FIGS. 4 to 8C. Thus, those features are not repeated herein. Note that the areas 904 from one side 960A correspond to areas 906 from the other side 960B of the layer 960, as illustrated in FIG. 9. In other words, the same areas on different sides of the layer 960 are interleaved.

Figure 10:
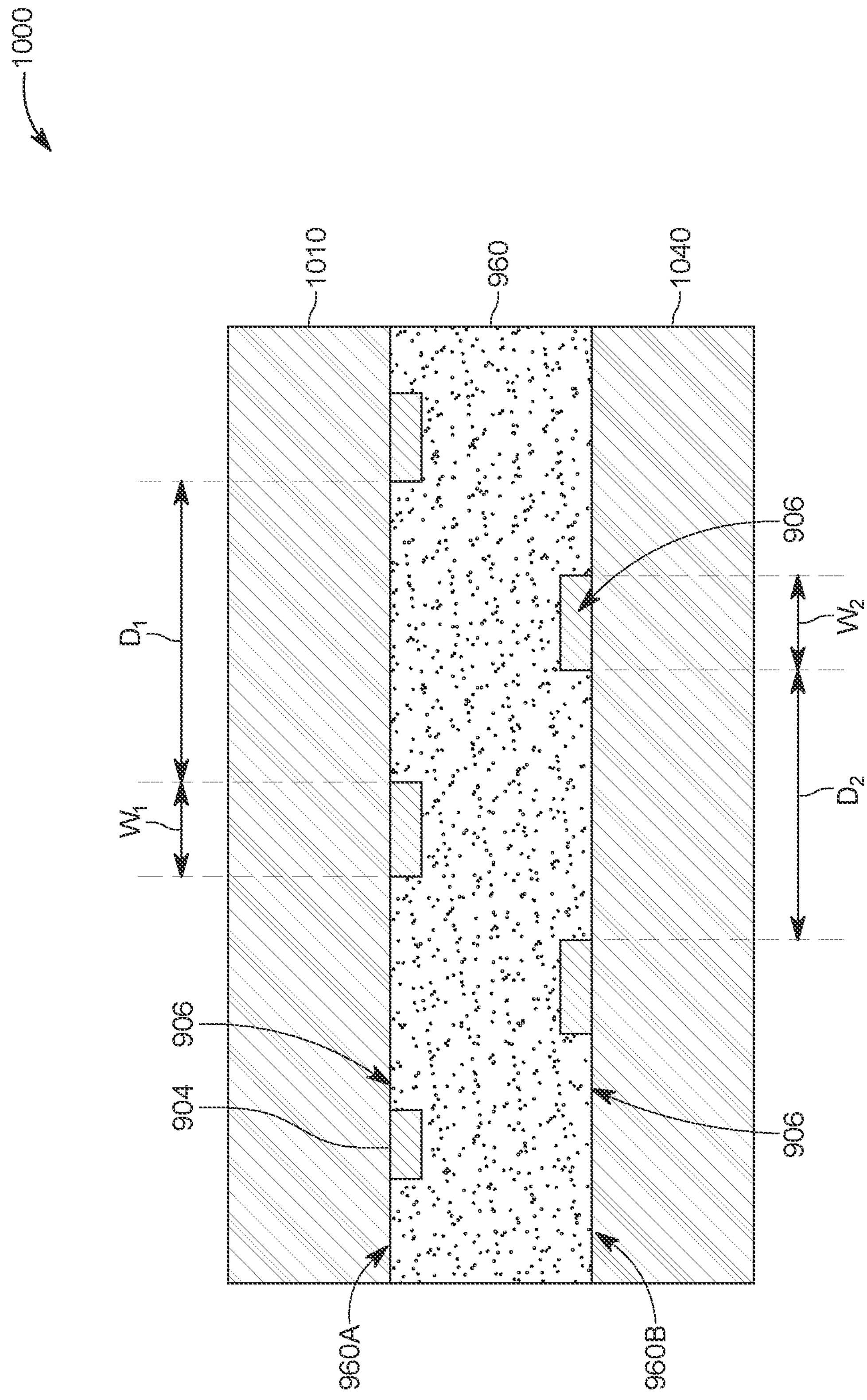
FIG. 10 shows a joint formed with two adherend panels and a solid adhesive layer, where the surfaces of the solid adhesive layer are patterned with different surface treatments.

A joint 1000 having panels 1010 and 1040 connected to each other with a patterned solid adhesive layer 960 is shown in FIG. 10. It is noted that the inner surfaces 1010A and 1040A of the panels 1010 and 1040 are flush, and have a single surface treatment or no surface treatment. However, the surfaces 960A and 960B of the solid adhesive layer 960 are patterned, having first areas 904 with a first surface treatment and second areas 906 with a second, different, surface treatment. The shapes, sizes W1 and/or W2, D1 and/or D2, and distribution of the areas 904 and 906 are similar to those shown in FIGS. 4 to 9. Note that in one embodiment, the areas 904 and 906 are flush with the outer surfaces of the solid adhesive layer.

Figure 11:
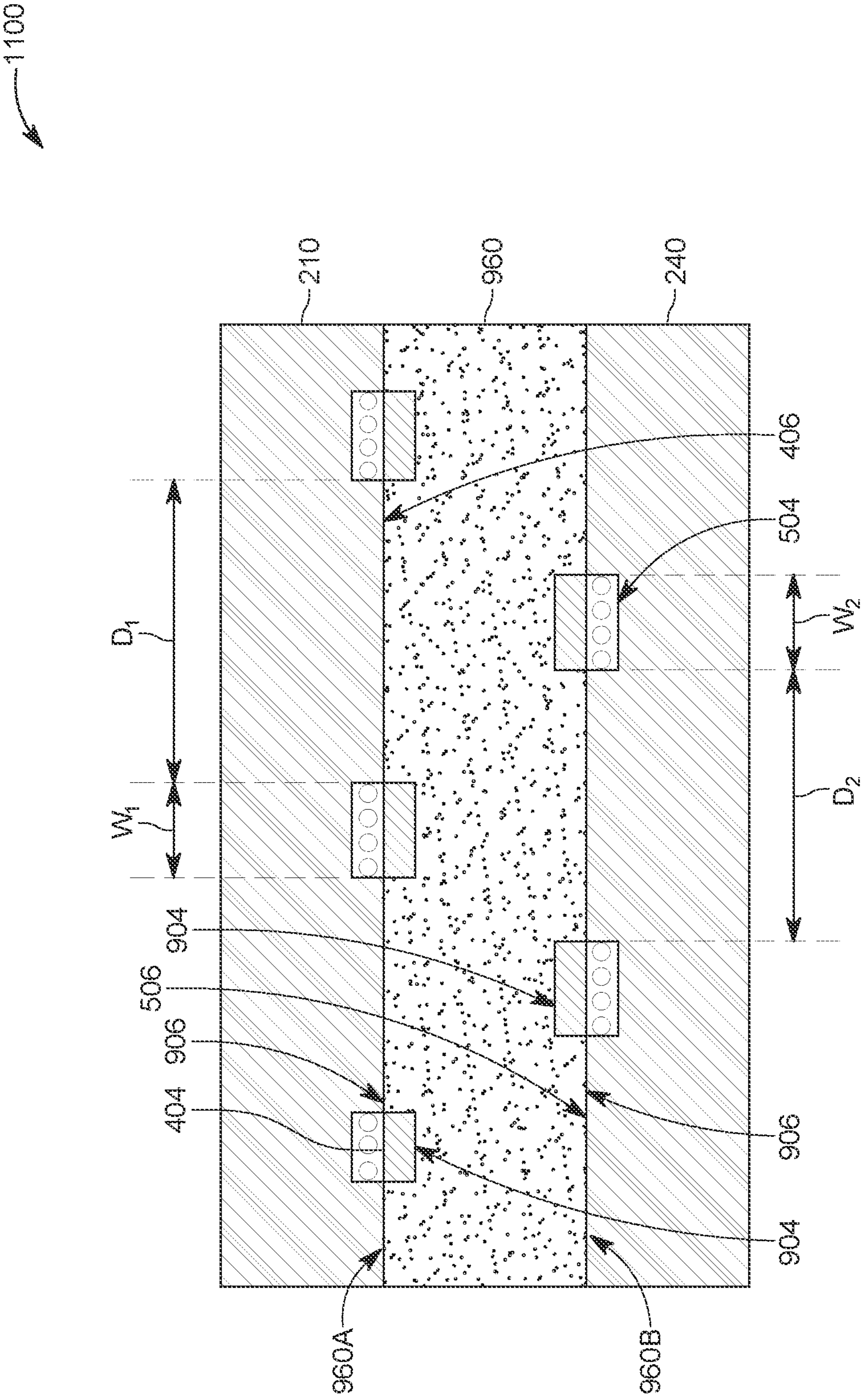
FIG. 11 shows a joint formed with two adherend panels and a solid adhesive layer, where the surfaces of the adherend panels and of the solid adhesive layer are patterned with different surface treatments.
Figure 12:
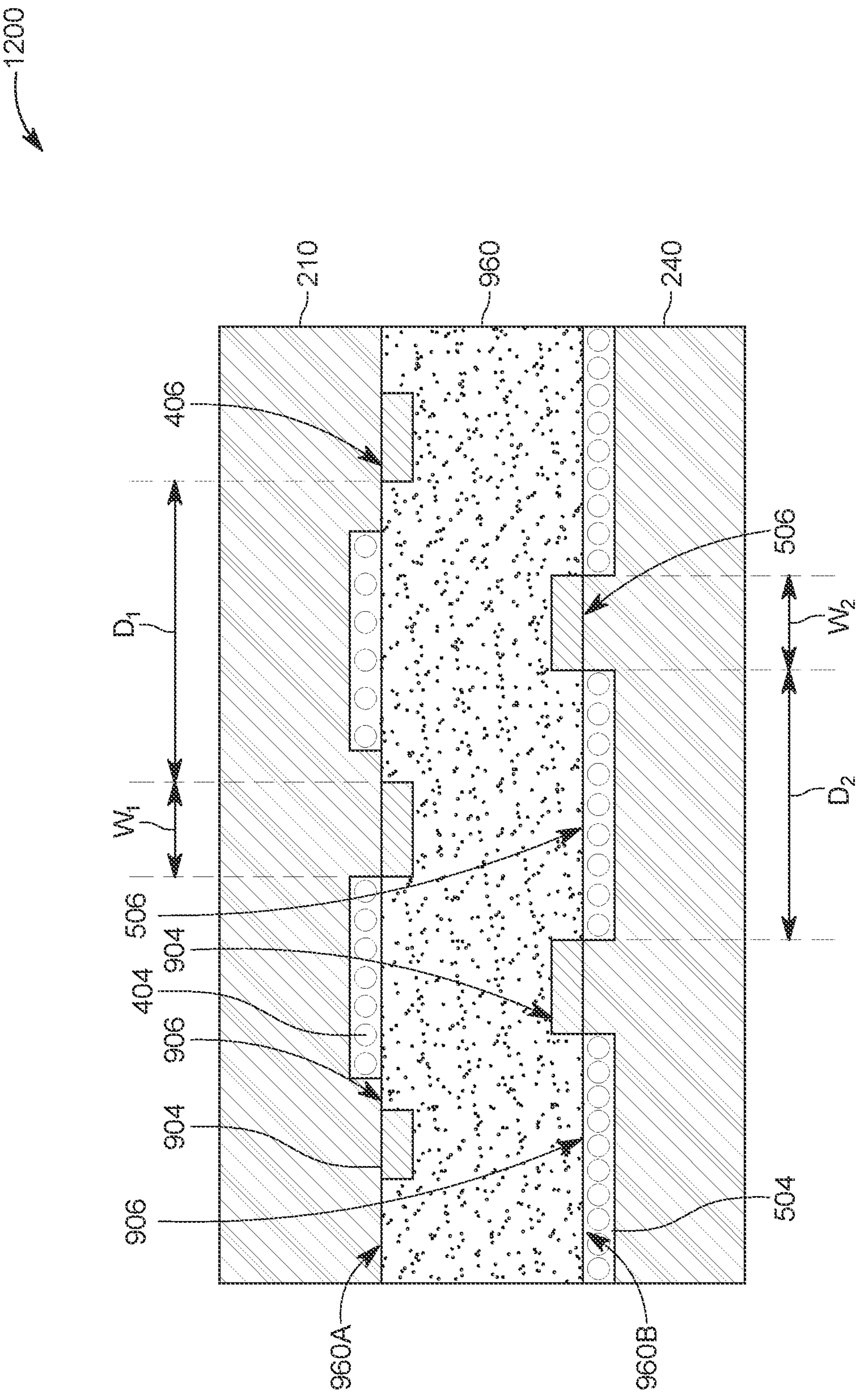
FIG. 12 shows another joint formed with two adherend panels and a solid adhesive layer, where the surfaces of the adherend panels and of the solid adhesive layer are patterned with different surface treatments.

In still another embodiment, it is possible to combine adherend panels having different surface treatments with a solid adhesive layer having different surface treatments, to obtain the join 1100 shown in FIG. 11 or the join 1200 shown in FIG. 12. The join 1100 in FIG. 11 has the areas 404 and 504 of the panels 210 and 240 matching the areas 904 of the solid adhesive layer 960, and the areas 406 and 506 matching the areas 906. In this embodiment, the areas 404, 504, and 904 may have the same first surface treatment, and the areas 406, 506, and 906 may have the same second surface treatment. However, the join 1200 in FIG. 12 has the areas 404 and 504 of the panels directly facing the areas 906 of the solid adhesive layer 960, and the areas 406 and 506 of the panels directly facing the areas 904 of the solid adhesive layer 960.

The surface roughness of the adherends 210 and 240 for the pattern shown in FIG. 7A, after laser treatment, was measured using contact profilometry with a 5 μm stylus tip diameter. The samples were scanned at the transition area between LA and LC regions in the fiber direction. Five scans were performed for each spot with 9 mm gauge length and 0.1667 μm/point resolution. A Field Emission Scan Electron Microscope (FE-SEM) was used with secondary electrons to inspect the morphology of the surfaces after treatments. An ENF test was used to obtain the mode II interlaminar fracture toughness of the secondary bonded panels 210 and 240. Based on the laser pre-treatments applied to the surfaces of the adherend panels 210 and 240, and the thickness of the adhesive layer 260, a test matrix was designed, as shown in FIG. 13, to study the effect of the laser patterning and adhesive thickness on the mode II fracture toughness.

Two data reduction methods were used to compute the evolution of mode II fracture, the Simple Beam Theory (SBT) and the Timoshenko Beam Theory (TBT). The SBT predicts that the mode II fracture toughness $G_{II}$ is given by:

$$G_{II} = \frac{9P^2a_e^2}{16B^2h^3E_{11}}, \tag{2}$$

where P is the load applied to the panel, $a_e$ is the effective crack length, B is the sample panel width (see FIG. 2), h is the adherend thickness (see also FIG. 2), and E is the elastic modulus of the adherend. The TBT theory predicts that the specimen compliance C is given by:

$$C = \frac{3a^3 + 2L^2}{8Bh^3E_f} + \frac{3L}{10G_{13}Bh}, \tag{3}$$

where a is the crack length, L is the half span length of the specimen, $G_{13}$ is the adherend flexural modulus, and $E_f$ is the equivalent flexural modulus. Based on the Irwin-Keis relationship and equation (3), the mode II fracture toughness $G_{II}$ can be calculated.

Figure 14:
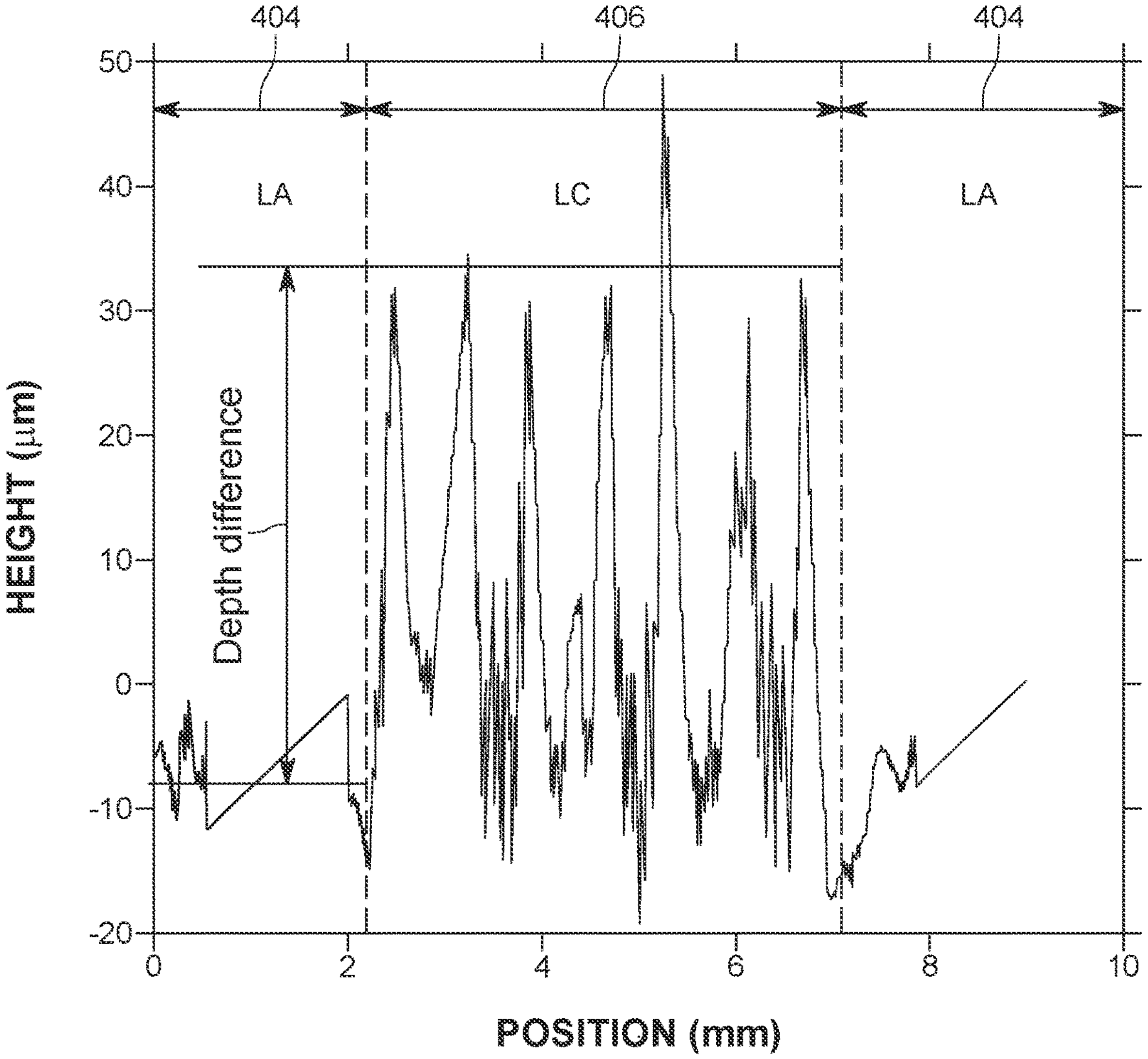
FIG. 14 illustrates the surface smoothness for the various surface treatments and the jump in the smoothness at the border between two different surface treatments.

The two data reduction methods SBT and TBT require only the load and vertical displacement data, which is recorded directly from the testing machine during the test, to predict the effective crack length and construct the R-curve. For these tests, the adherend's surface characteristics when the LA and LC treatments were applied, were determined to be as illustrated in FIG. 14. The area 406 has a width W=5 mm and the distance D between two successive areas 406 is D=5 mm. FE-SEM of the treated surfaces demonstrates that the LC treatment keeps the same morphology of the peel-plies. A slight removal of the epoxy on the surface 406 is observed, which results in naked fibers 402, which helps for better bonding between the adherend and adhesive. On the other hand, the FE-SEM observation of the LA treated surface 404 demonstrates a full removal of the epoxy at the surface, leaving detached fibers 402 on the surface. FIG. 14 shows that the surface roughness of the LC area and the transition stage between the LA and LC areas is high. The LC treated area 406 exhibits periodic peaks with local high-frequency fluctuations with an average roughness of 33 μm, while the LA laser treated area 404 exhibits a smooth surface with an average roughness of 8 μm due to the removal of the epoxy. In other words, the epoxy surface, which corresponds to the second surface treatment is much rougher (for example, 4 or more times larger) than the surface created by the exposed fibers 402, which corresponds to the first surface treatment. These values indicate that the fibers 402 at the surface are completely free at this area because the average fiber diameter is 7 μm. Due to this different roughness between the two surfaces 404 and 406, the joints discussed above achieve a depth difference at the transition edge between the LA and LC of around 40 μm, which helps to arrest a crack at this transition edge. For the purpose of this embodiment, the surface roughness is quantified by the deviations in the direction of the normal vector of a real surface from its ideal form. Thus, with regard to the surface shown in FIG. 14, the surface roughness is the distance from the minimum peak to the maximum peak, which is about 8 μm for the first treatment and about 33 μm for the second treatment.

Figure 15A:
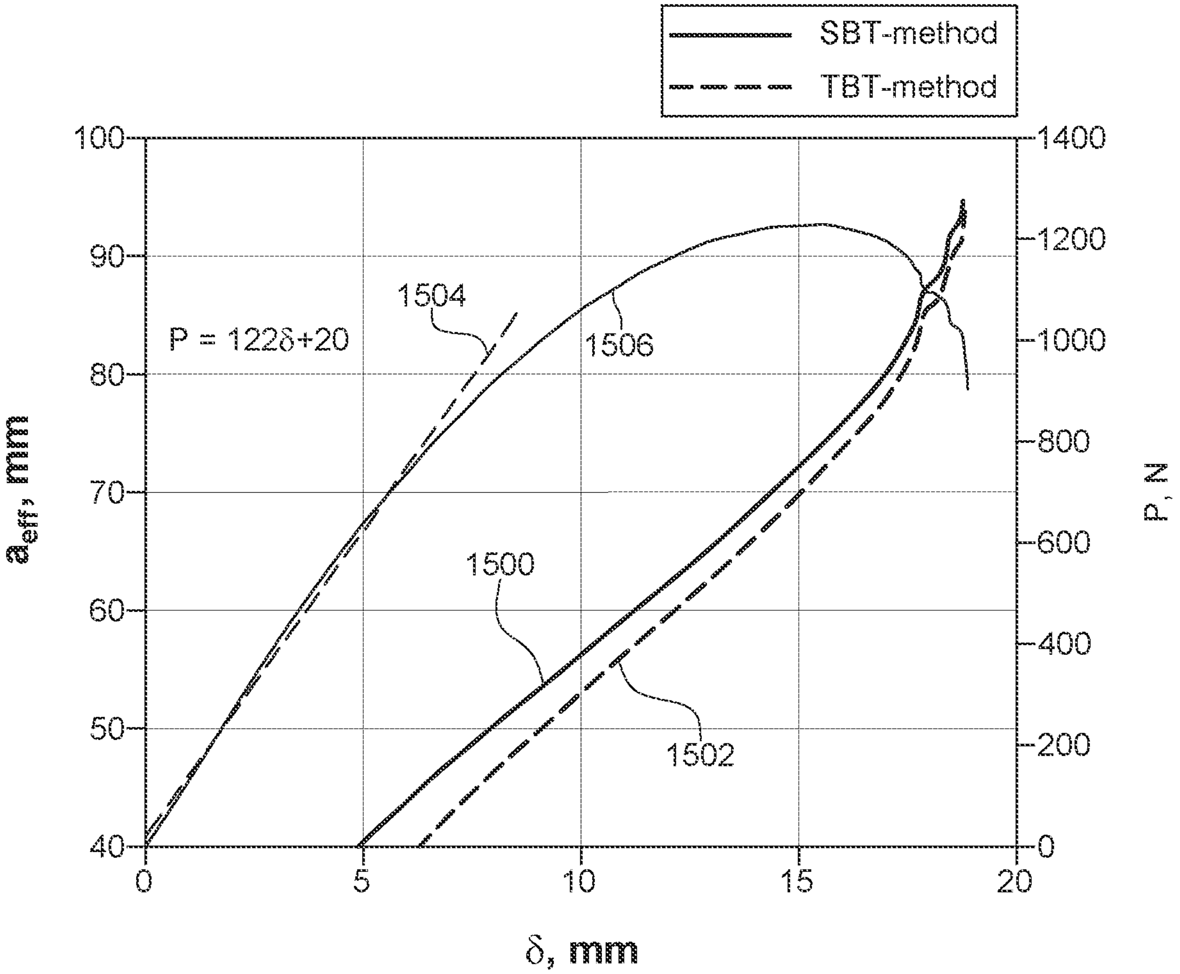
FIGS. 15A and 15B illustrate various parameters associated with the mode I and mode II toughness of the joints having two or more surface treatments.
Figure 15B:
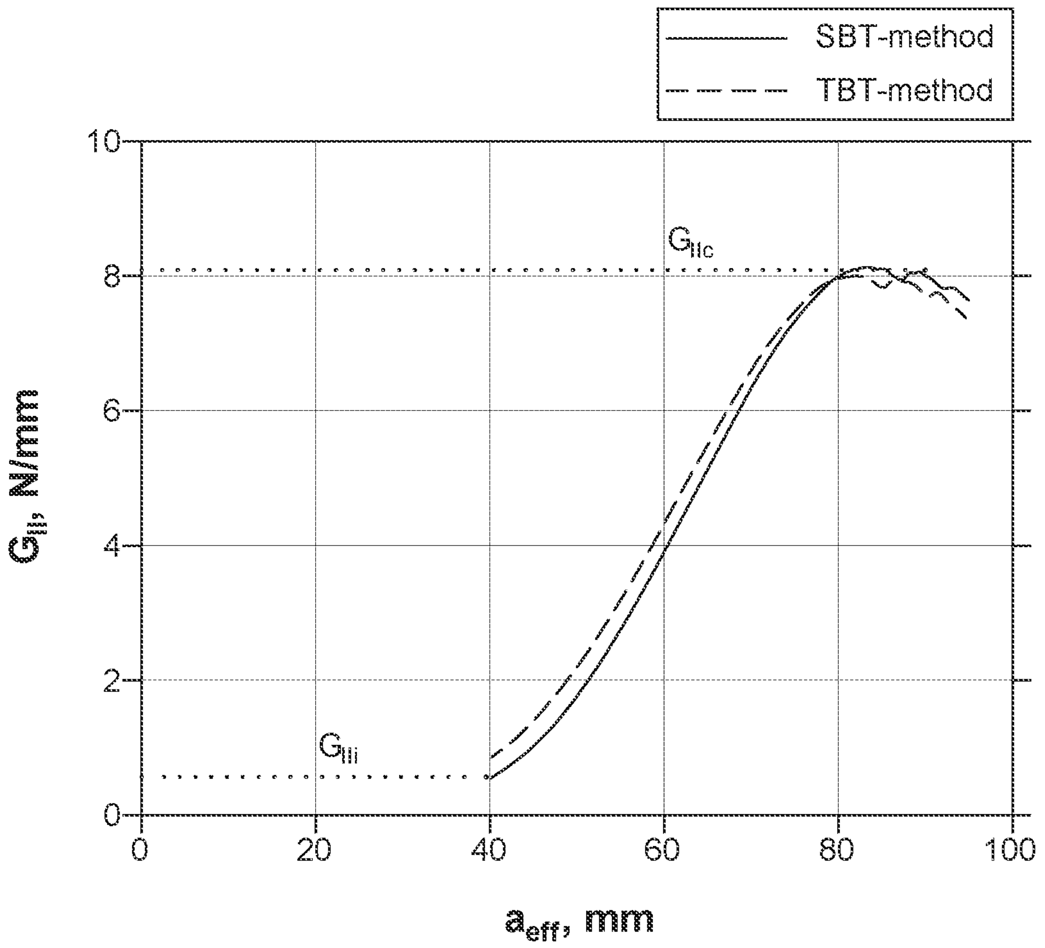
Figure 16A:
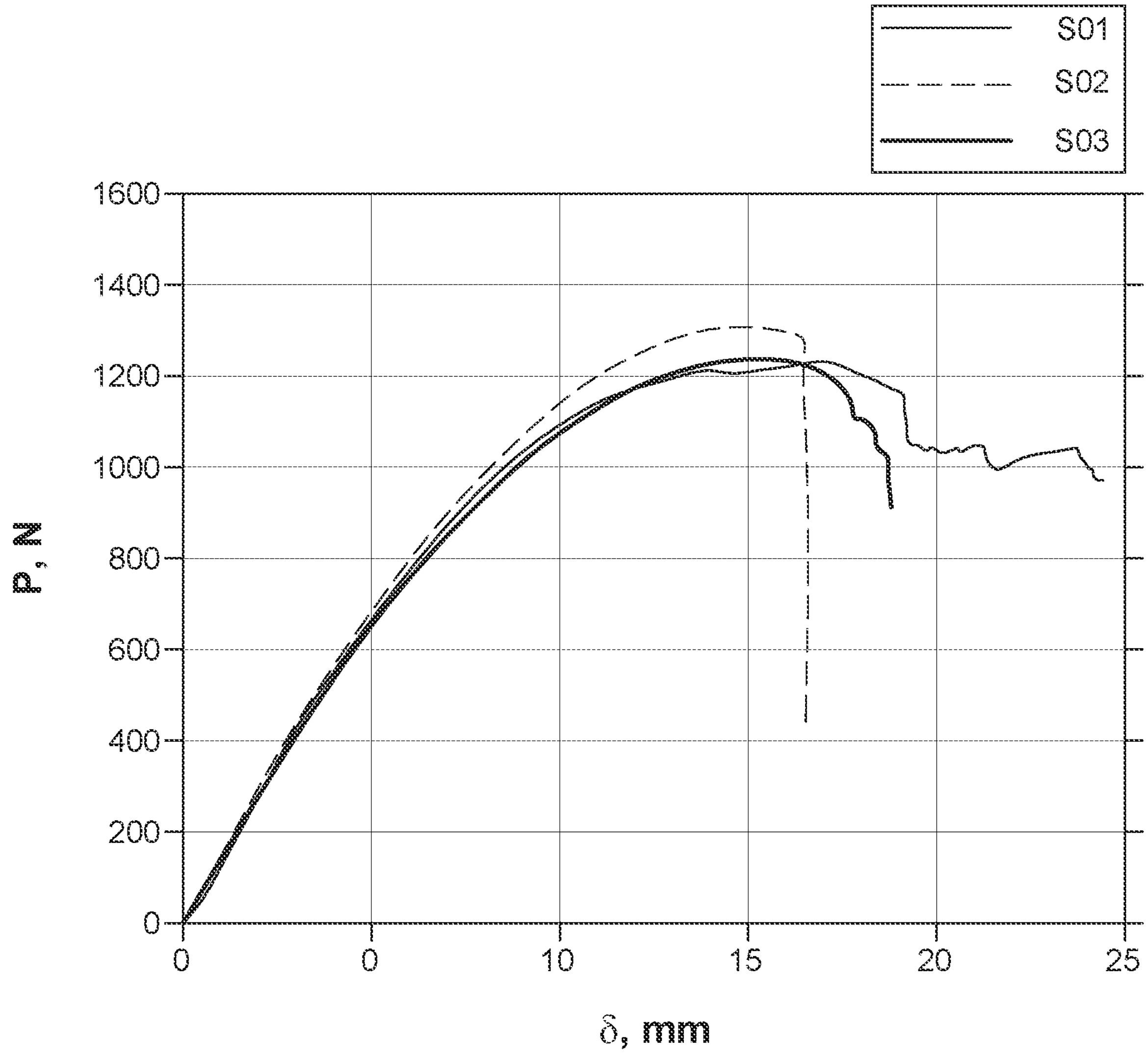
FIGS. 16A to 16F show the load-displacement responses and corresponding R-curves of various joints discussed herein.
Figure 16B:
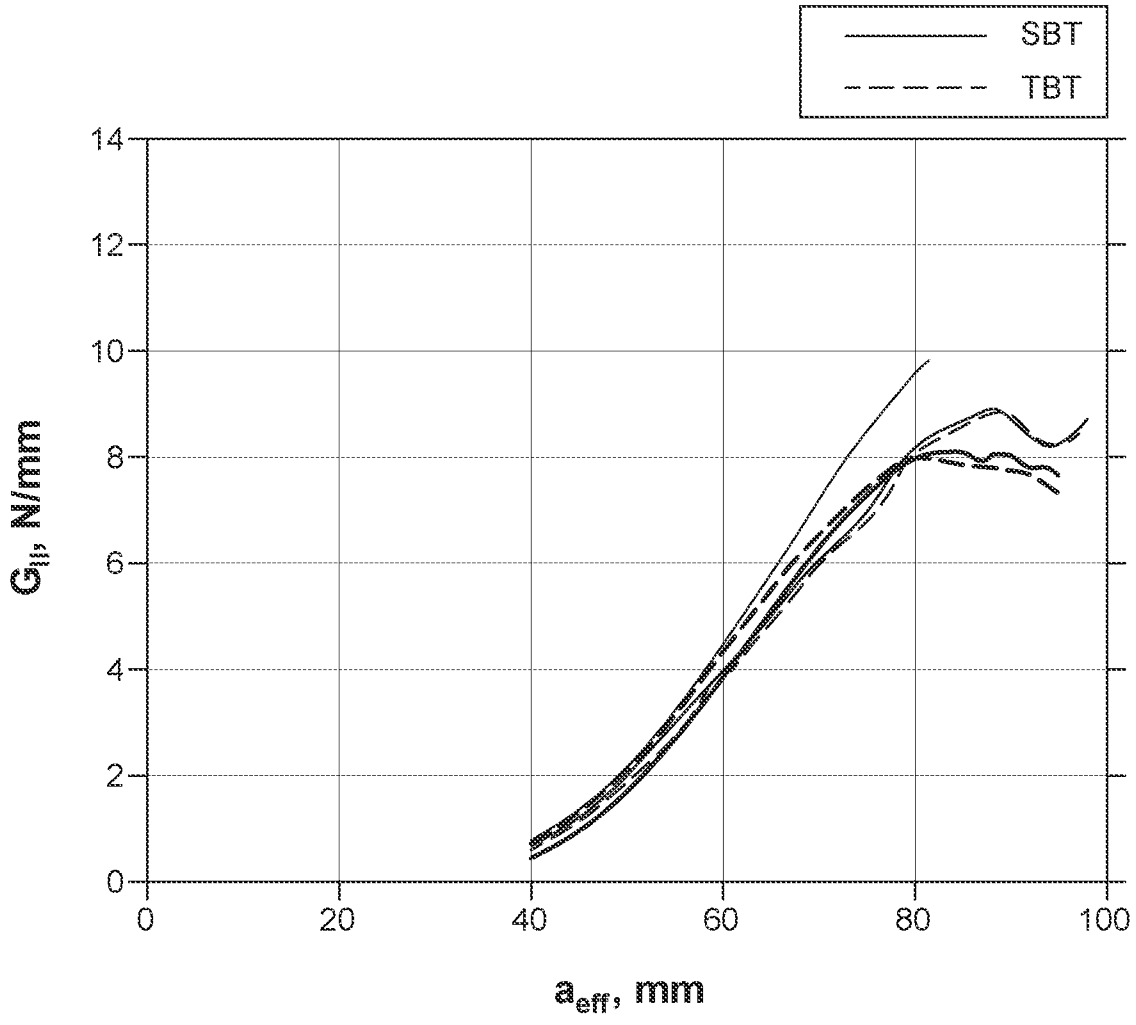
Figure 16C:
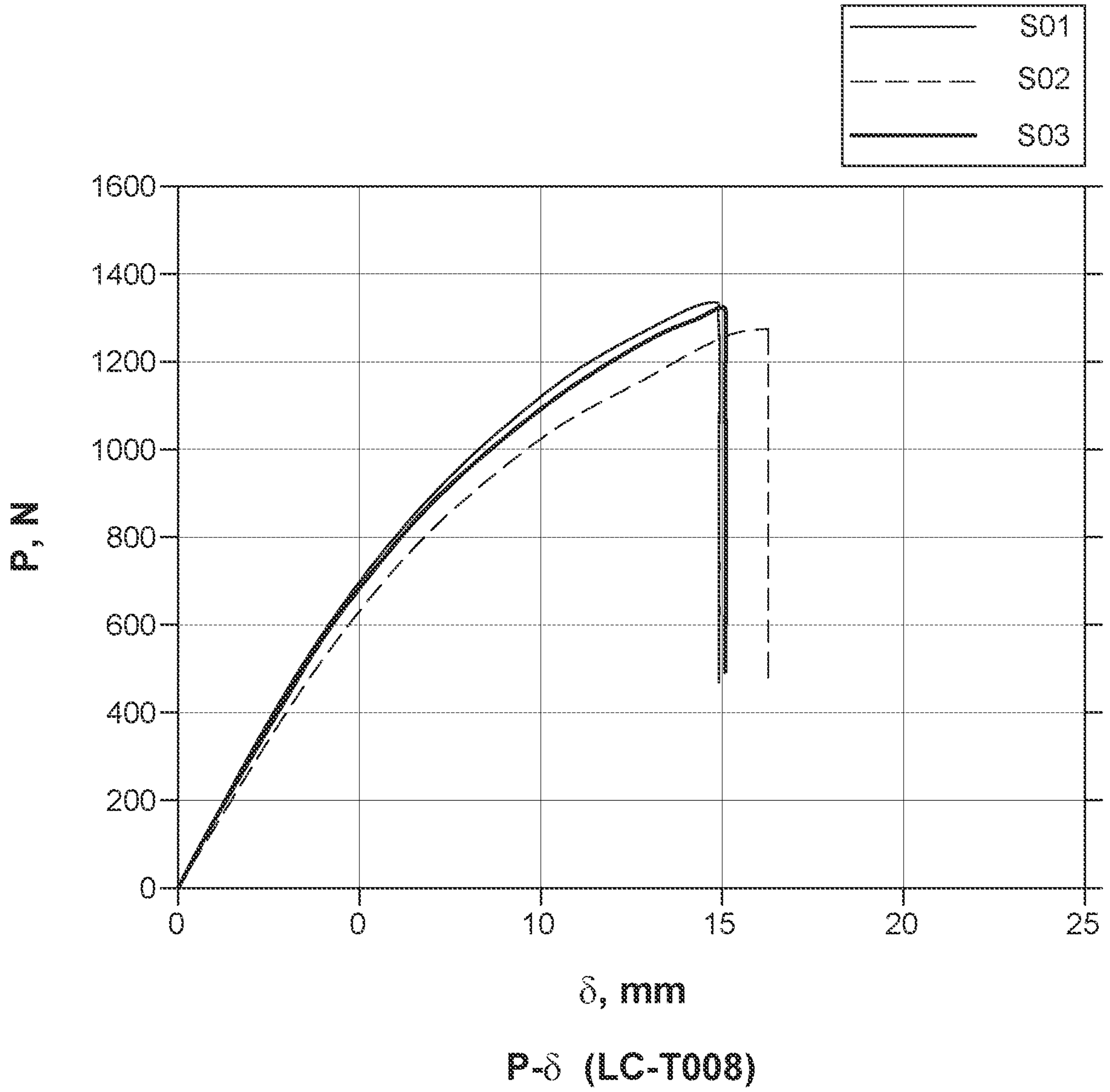
Figure 16D:
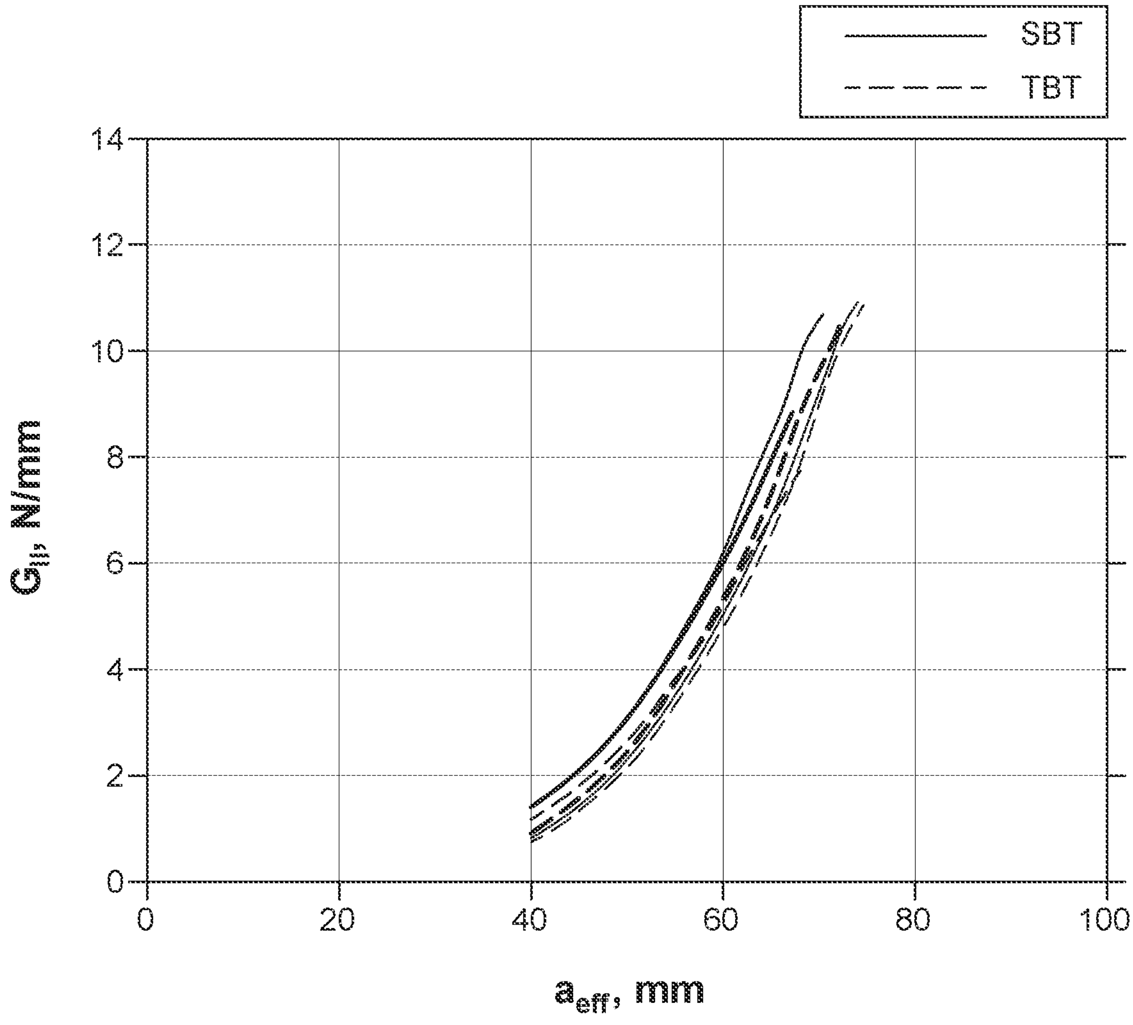
Figure 16E:
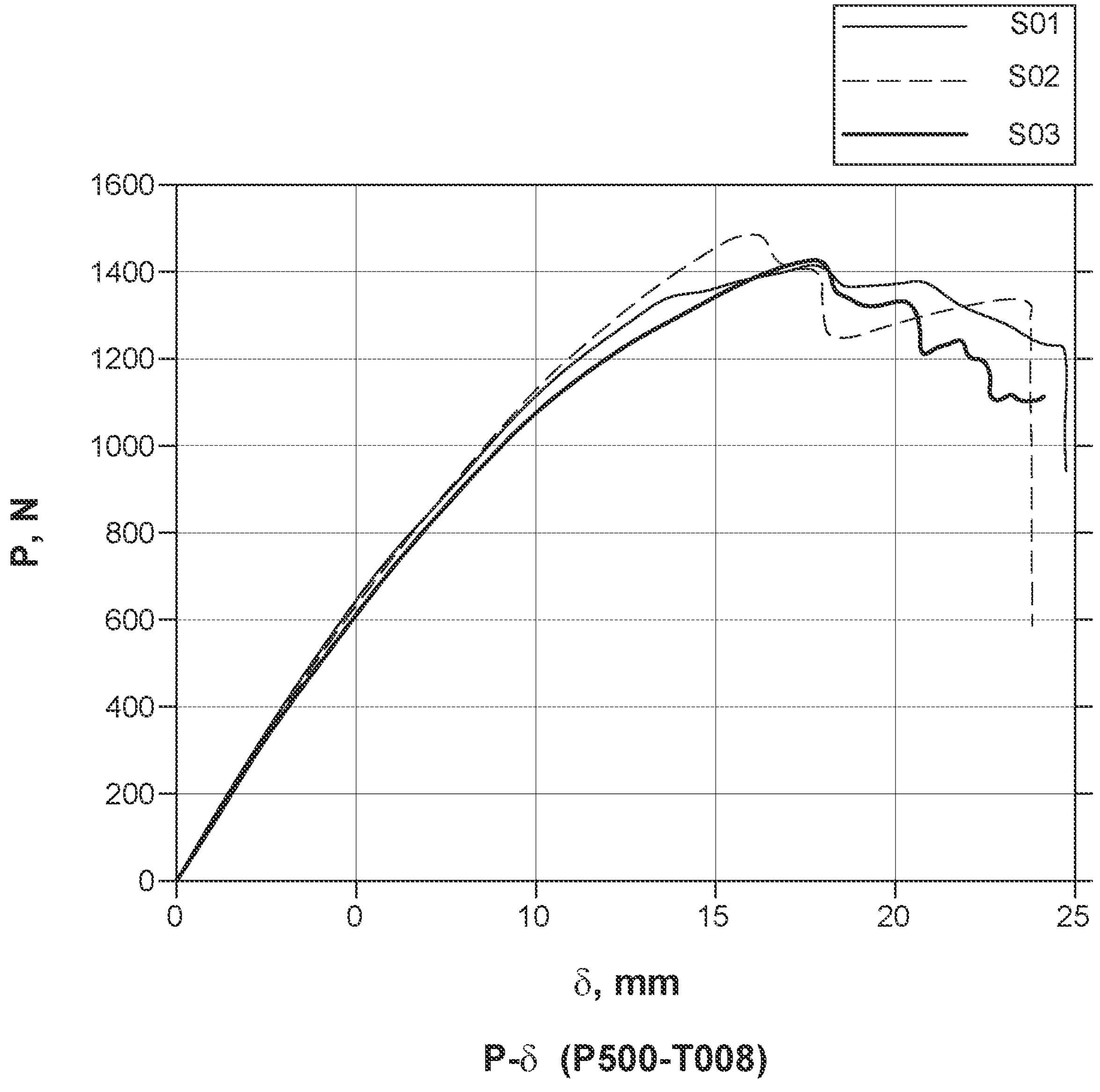
Figure 16F:
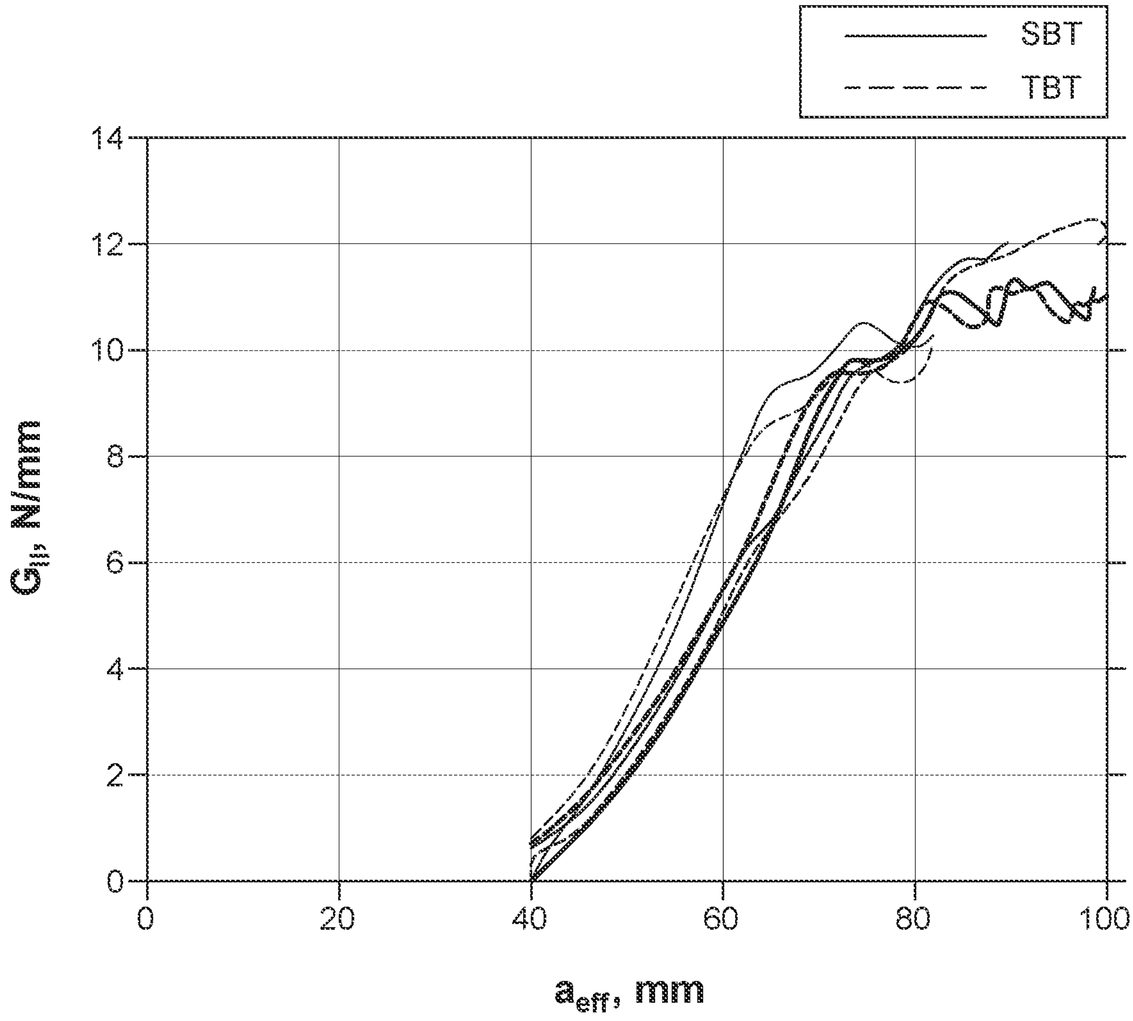

FIGS. 15A and 15B show an example of a load-displacement (P–δ), effective crack length-displacement ($a_{eff}$–δ), and mode II fracture toughness-crack length ($G_{11}$–$a_{eff}$) behavior (R-curve) of a LA-T008 sample (see the table in FIG. 13 for the meaning of the label LA-T008) computed using both data reduction methods to highlight some characteristics about the data reduction methods. In FIG. 15A, the effective crack length $a_{eff}$, computed using both data reduction methods, SBT (equation (2)) and TBT (equation (3)), is shown by corresponding (P–δ) curves 1500 and 1502. It is shown that the SBT method exhibits an earlier effective crack propagation than the TBT method. This is due to the hypothesis followed by each method to define the crack initiation. For the SBT methods, $a_{eff}$ is computed by substituting the load and displacement at each loading increment in equation (2), therefore, once the compliance changes, the method considers crack initiation. However, for the TBT method, the method considers crack initiation when the defined value of the measured compliance is larger than the defined initial compliance, $C_0$, which in this case equals 1/122 mm/N (inverse of slope of linear fitting equation 1504 in the figure). This initial compliance is defined by a linear fitting 1504 of the elastic loading part of the P–δ curve 1506, as shown in FIG. 15A.

The R-curve of this sample, as shown in FIG. 15B, is identical for the two methods, with a slight variation between the two methods due to the difference in the definition of the crack initiation. Two features can be extracted from this figure, the initiation and propagation fracture toughness, $G_{IIi}$ and $G_{IIc}$, respectively. The initiation fracture toughness is the fracture toughness at the initial crack length, i.e., 40 mm. The fracture toughness increases with increasing the crack length until achieving a fairly constant value at which the $G_{IIc}$ is defined. In this stage, the crack propagates in self similar way at around 80 mm, which mean that the crack does not need excess energy to propagate. Both methods show almost equal $G_{IIc}$, while they show slightly different $G_{IIi}$ values due to the difference in the crack initiation definition of both methods.

FIGS. 16A to 16F show the P–δ and R-curve plots of three tested samples with 0.8 mm adhesive thickness for the LA-T008, LC-T008, P500-T008 configurations (note that the structure of these configurations is illustrated in FIG. 13). The figures reflect the good repeatability of the test in the three considered configurations with slight difference in the load displacement response which is typical for such tests. Differences between the initial stiffness of some samples is observed due to the precision of the initial crack length positioning on the fixture, which is a manual procedure. A summary of the maximum load, Pmax, and fracture toughness, GIIi and GIIc, computed using the SBT and TBT methods is illustrated in FIG. 17.

Figure 18A:
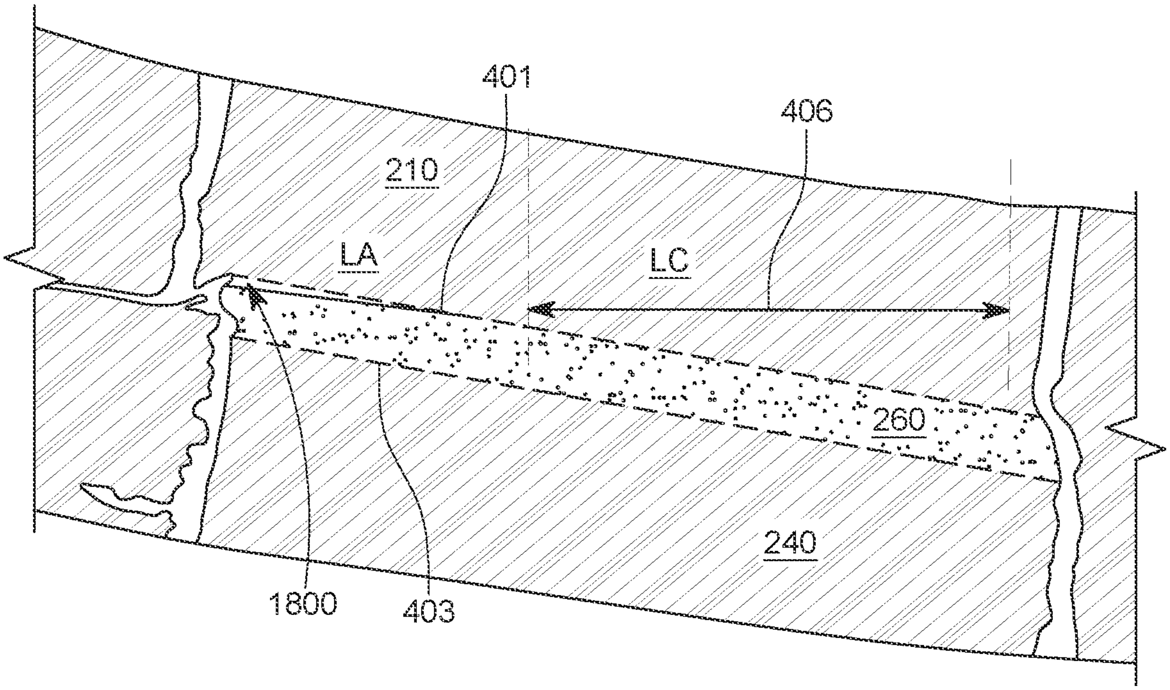
FIGS. 18A to 18C illustrate the propagation of a crack between two adherend panels when using two or more surface treatments.
Figure 18B:
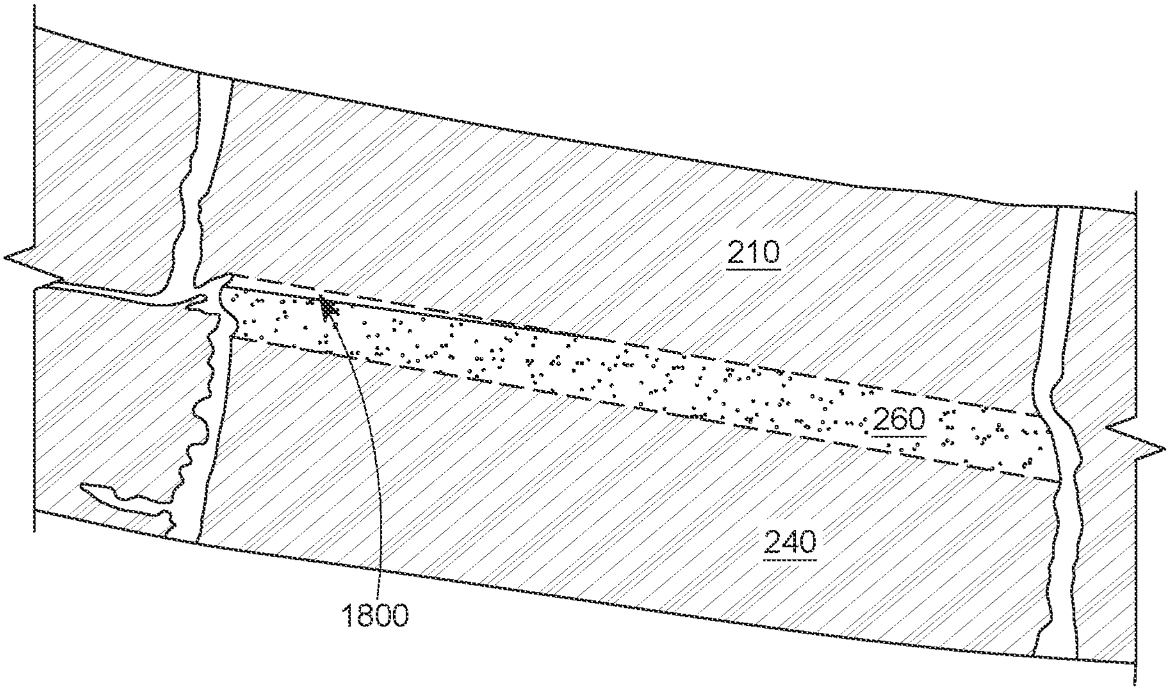
Figure 18C:
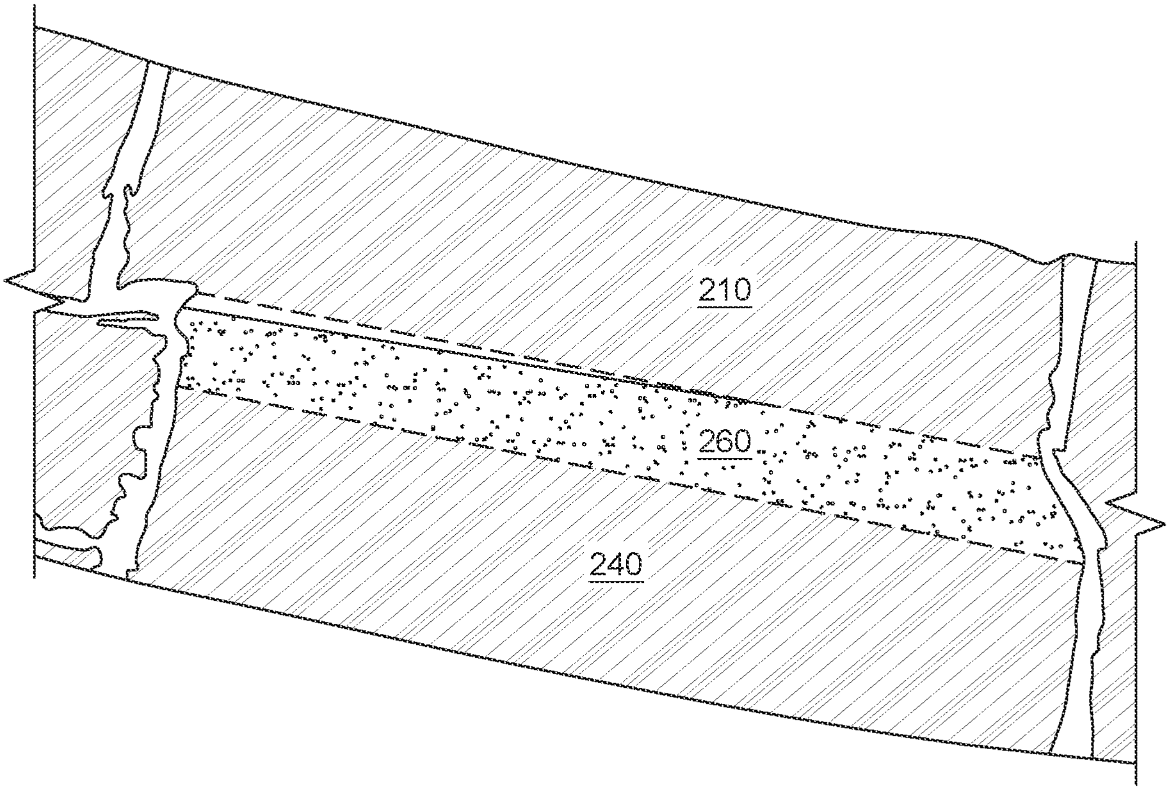
Figure 19:
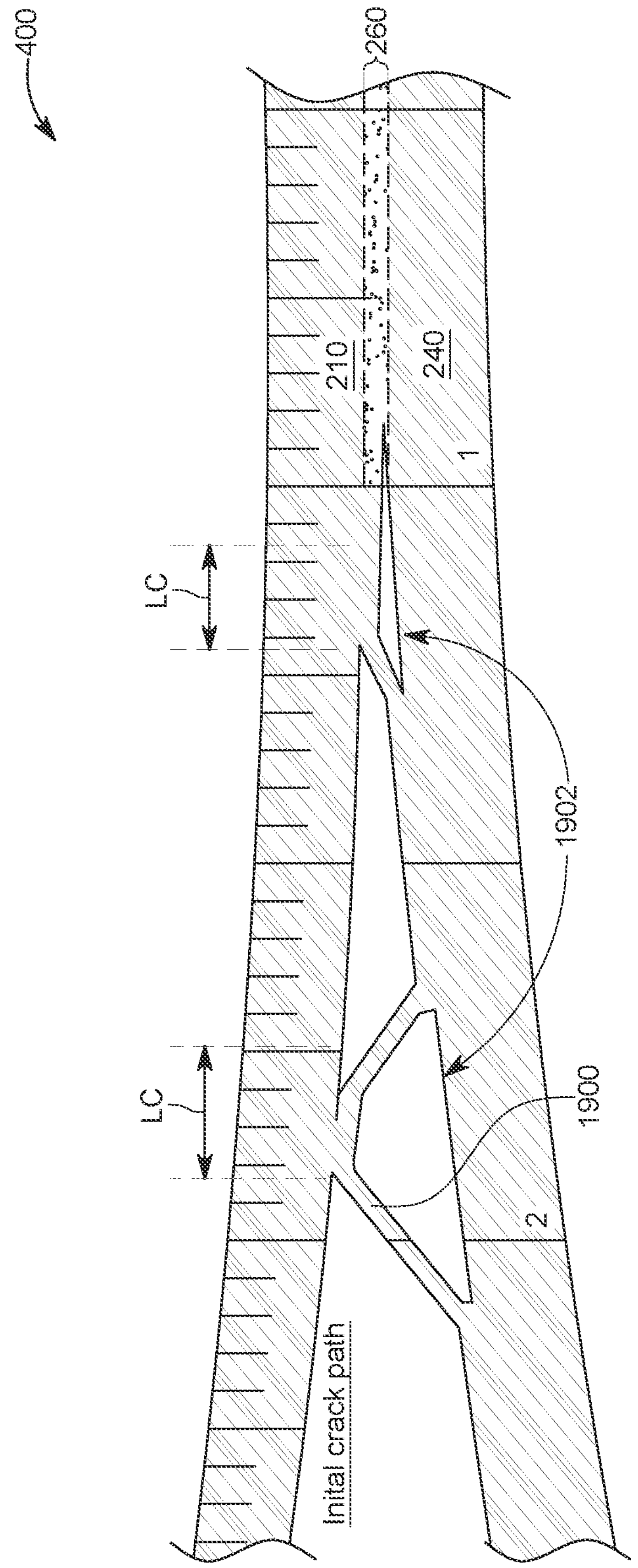
FIG. 19 is an image taken while one of the joint discussed herein is cracking.

The inventors have observed from these experiments that the proposed surface patterning of one or both of the adherend panels, and/or the solid adhesive layer improved the mode II fracture toughness achieving a 23.8% $G_{II}$ improvement for the LC treatment width of 2.5 mm when compared to uniform laser ablation treatment. The $G_{II}$ improvement rate is increased with increasing the LC treatment width reaching 60% for 10 mm width. This improvement is due to the activation of nonlocal damage mechanisms such as adhesive cracking and failure and crack migration to the other interface, as illustrated in FIGS. 18A to 18C. The crack 1800 initiates in the upper interface 401 of the joint 400 and propagates until reaching an LC treatment area 406, at which the crack 1800 is arrested due to the better adhesion at this area and the difference in adherend surface depth. When the crack was arrested, a higher energy was needed to propagate the crack. This energy is dissipated to generate cracks inside the adhesive layer 260. These cracks cause adhesive failure when they propagate inter-facially through the adhesive. However, when these cracks reach the lower interface 403, a decohesion crack initiates in the lower interface. These three nonlocal damage mechanisms required higher energy to be generated and propagated, which improve the fracture energy of the joint 400. Further, FIG. 19 shows that the patterning of the adherend panels 210 and 240 and/or the solid adhesive layer 260 successfully trigger adhesive ligaments 1900 bridging the separating panels 210 and 240, i.e., forming cracking bridging zones 1902, which promote a large amount of extrinsic energy dissipation.

Figure 20:
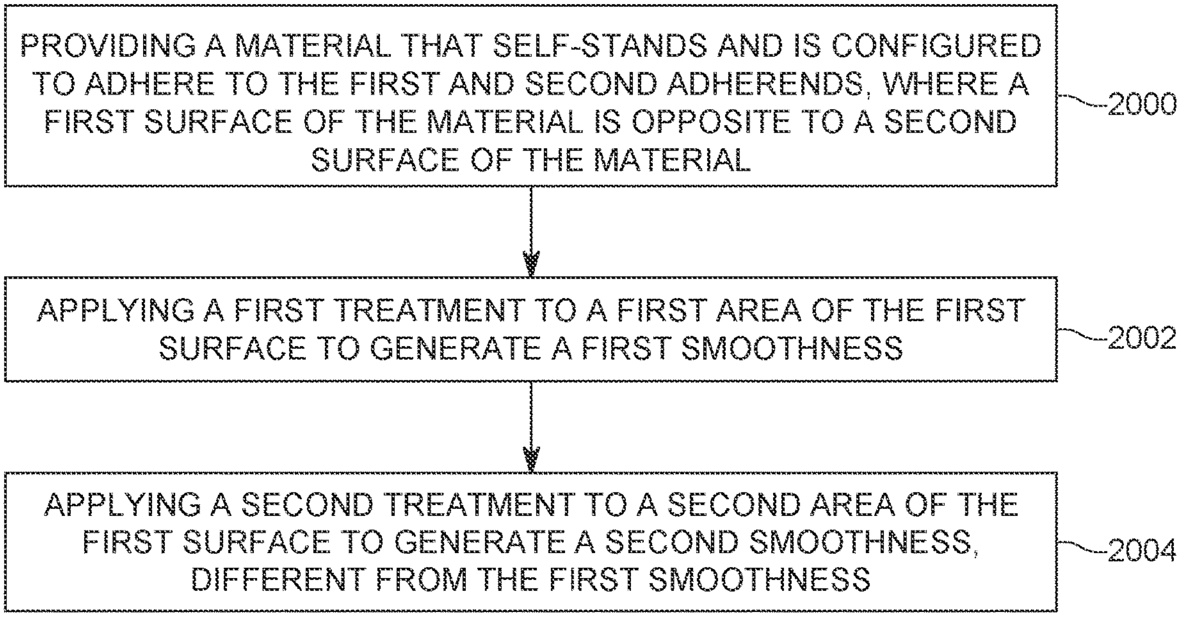
FIG. 20 is a flow chart of a method for making a joint having a solid adhesive layer with two or more surface treatments.

Based on the above disclosures, a method for making a self-standing adhesive layer that is configured to join a first adherend panel to a second adherend panel, without the need of any additional material, is now discussed with regard to FIG. 20. The method includes a step 2000 of providing a material that self-stands and is configured to adhere to the first and second adherends, where a first surface of the material is opposite to a second surface of the material, a step 2002 of applying a first treatment to a first area of the first surface to generate a first smoothness, and a step 2004 of applying a second treatment to a second area of the first surface to generate a second smoothness, different from the first smoothness. The first and second areas form a pattern on the first surface.

In one application, the first treatment is a laser treatment with a first fluence, and the second treatment is another laser treatment with a second fluence, lower than the first fluence. In another application, the first treatment is a laser treatment and the second treatment is a non-laser treatment. The second treatment may be a mechanical treatment.

The method may further include a step of applying the first treatment to a first area of the second surface to generate the first smoothness, and a step of applying the second treatment to a second area of the second surface to generate the second smoothness, wherein the first and second areas form a pattern on the second surface. In one application, the first area of the first surface faces the second area of the second surface, and the second area of the first surface faces the first area of the second surface. In this or another application, the first and second areas of the first surface includes plural parallel strips. In this or yet another application, the first or second areas of the first surface are circles. In this or yet another application, the first and second areas have random shapes. In this or yet another application, the first areas are placed randomly across the first surface.

Figure 21:
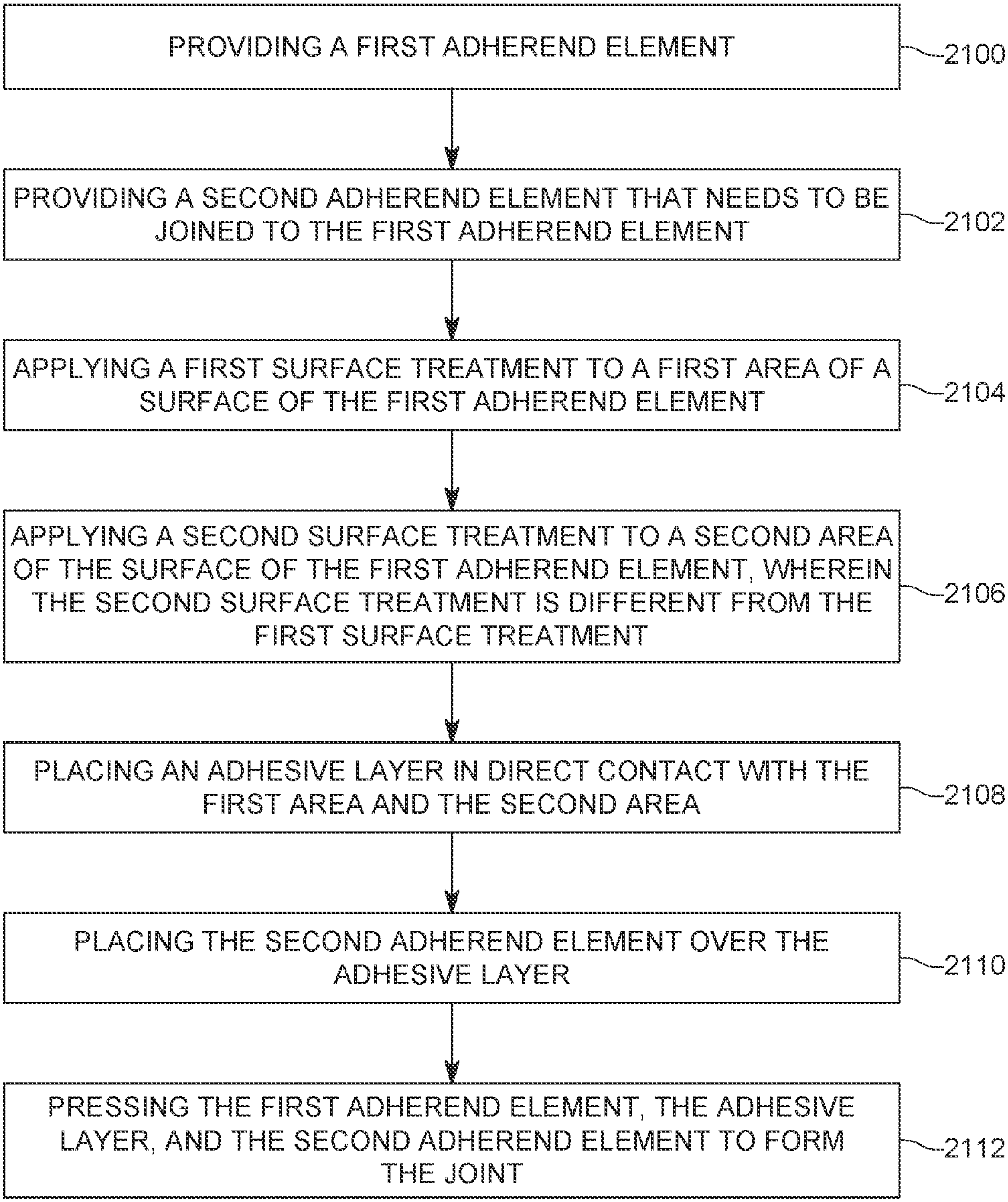
FIG. 21 is a flow chart of a method for making a joint having the surface of one or both adherend panels treated with two or more surface treatments.

In another embodiment, as illustrated in FIG. 21, there is a method for improving a mode II toughness of a joint by generating one or more patterns in one or more surfaces of the adherend panels of the joint. More specifically, the method includes a step 2100 of providing a first adherend element, a step 2102 of providing a second adherend element that needs to be joined to the first adherend element, a step 2104 of applying a first surface treatment to a first area of a surface of the first adherend element, a step 2106 of applying a second surface treatment to a second area of the surface of the first adherend element, wherein the second surface treatment is different from the first surface treatment, a step 2108 of placing an adhesive layer in direct contact with the first area and the second area, a step 2110 of placing the second adherend element over the adhesive layer, and a step 2112 of pressing the first adherend element, the adhesive layer, and the second adherend element to form the joint. The first area follows a first pattern and the second area follow a second pattern.

The method may further include a step of applying the first surface treatment to a first area of a surface of the second adherend element, a step of applying the second surface treatment to a second area of the surface of the second adherend element, and a step of placing the second adherend element over the adhesive layer so that the first and second areas of the second adherend element directly contact the adhesive layer. The method may also include a step of aligning the first area of the first adherend element to be opposite to the second area of the second adherend element, and a step of aligning the second area of the first adherend element to be opposite to the first area of the second adherend element.

The disclosed embodiments provide a method for treating one or more surfaces of a joint for improving a mode II toughness. It should be understood that this description is not intended to limit the invention. On the contrary, the embodiments are intended to cover alternatives, modifications and equivalents, which are included in the spirit and scope of the invention as defined by the appended claims. Further, in the detailed description of the embodiments, numerous specific details are set forth in order to provide a comprehensive understanding of the claimed invention. However, one skilled in the art would understand that various embodiments may be practiced without such specific details.

Although the features and elements of the present embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

REFERENCES

[1] Prolongo S, Gude M, Del Rosario G, Urena A. Surface pretreatments for composite joints: study of surface profile by SEM image analysis. Journal of Adhesion Science and Technology 2010; 24(11-12):1855-67.

[2] Holtmannspotter J, Czarnecki J, Wetzel M, Dolderer D, Eisenschink C. The use of peel ply as a method to create reproduceable but contaminated surfaces for structural adhesive bonding of carbon fiber reinforced plastics. The Journal of Adhesion 2013; 89(2):96-110.

[3] Boerio F, Roby B, Dillingham R, Bossi R, Crane R. Effect of grit-blasting on the surface energy of graphite/epoxy composites. The Journal of Adhesion 2006; 82(1): 19-37.

[4] Moreira R, Oliveira V, Silva F, Vilar R, de Moura M. Mode II fracture toughness of carbon—epoxy bonded joints with femtosecond laser treated surfaces. International Journal of Mechanical Sciences 2018; 148:707-13.

[5] Fischer F, Kreling S, Jaschke P, Frauenhofer M, Kracht D, Dilger K. Laser surface pre-treatment of CFRP for adhesive bonding in consideration of the absorption behaviour. The Journal of Adhesion 2012; 88(4-6):350-63.

[6] Tao R, Alfano M, Lubineau G. In situ analysis of interfacial damage in adhesively bonded composite joints subjected to various surface pretreatments. Composites Part A: Applied Science and Manufacturing 2019; 116: 216-23.

[7] Tao R, Alfano M, Lubineau G. Laser-based surface patterning of composite plates for improved secondary adhesive bonding. Composites Part A: Applied Science and Manufacturing 2018; 109:84-94.

What is claimed is:

1. A self-standing adhesive layer configured to join a first adherend to a second adherend, with no additional adhesive, the adhesive layer comprising:

a material that self-stands and is configured to adhere to the first and second adherends;

a first surface of the material is opposite to a second surface of the material;

a first area of the first surface has a first smoothness resulting from a first surface treatment; and a second area of the first surface has a second smoothness, different from the first smoothness, resulting from a second surface treatment, which is different from the first surface treatment, wherein the first and second areas are flat and coplanar, and wherein the first and second areas form a non-uniform preset pattern on the first surface to increase a mode II fracture toughness.

2. The adhesive layer of claim 1, further comprising:

a first area of the second surface has the first smoothness; and a second area of the second surface has the second smoothness, wherein the first and second areas form a pattern on the second surface.

3. The adhesive layer of claim 2, wherein the first area of the first surface faces the second area of the second surface, and the second area of the first surface faces the first area of the second surface.

4. The adhesive layer of claim 1, wherein the first and second areas of the first surface each includes plural parallel strips.

5. The adhesive layer of claim 1, wherein the first or second areas of the first surface are circles.

6. The adhesive layer of claim 1, wherein the first and second areas have random shapes.

7. The adhesive layer of claim 1, wherein the first areas are placed randomly across the first surface.

8. A method for making a self-standing adhesive layer that is configured to join a first adherend to a second adherend with no additional adhesive, the method comprising:

providing a material that self-stands and is configured to adhere to the first and second adherends, wherein a first surface of the material is opposite to a second surface of the material;

applying a first treatment to a first area of the first surface to generate a first smoothness; and applying a second treatment to a second area of the first surface to generate a second smoothness, different from the first smoothness, wherein the first surface treatment is different from the second surface treatment, wherein the first and second areas are flat and coplanar, and wherein the first and second areas form a non-uniform preset pattern on the first surface to increase a mode II fracture toughness.

9. The method of claim 8, wherein the first treatment is a laser treatment with a first fluence, and the second treatment is another laser treatment with a second fluence, lower than the first fluence.

10. The method of claim 8, wherein the first treatment is a laser treatment and the second treatment is a non-laser treatment.

11. The method of claim 10, wherein the second treatment is a mechanical treatment.

12. The method of claim 8, further comprising:

applying the first treatment to a first area of the second surface to generate the first smoothness; and applying the second treatment to a second area of the second surface to generate the second smoothness, wherein the first and second areas form another pattern on the second surface.

13. The method of claim 12, wherein the first area of the first surface faces the second area of the second surface, and the second area of the first surface faces the first area of the second surface.

14. The method of claim 8, wherein the first and second areas of the first surface include plural parallel strips.

15. The method of claim 8, wherein the first or second areas of the first surface are shaped as circles.

16. The method of claim 8, wherein the first and second areas have random shapes.

17. The method of claim 8, wherein the first areas are placed randomly across the first surface.

* * * * *